United States Patent [19]

Brown et al.

[11] Patent Number: 5,226,120
[45] Date of Patent: Jul. 6, 1993

[54] APPARATUS AND METHOD OF MONITORING THE STATUS OF A LOCAL AREA NETWORK

[75] Inventors: Brian Brown; Shabbir A. Chowdhury, both of San Jose, Calif.

[73] Assignee: Synoptics Communications, Inc., Santa Clara, Calif.

[21] Appl. No.: 526,567

[22] Filed: May 21, 1990

[51] Int. Cl.$^5$ .................... G06F 11/30; G06F 11/32
[52] U.S. Cl. .................................. 395/200; 395/161
[58] Field of Search ............... 395/200, 155, 161, 275, 395/600; 340/825.44; 370/112

[56] References Cited

U.S. PATENT DOCUMENTS

| | | | |
|---|---|---|---|
| 4,055,808 | 10/1977 | Holsinger et al. | 375/8 |
| 4,545,013 | 10/1985 | Lyon et al. | 395/200 |
| 4,578,773 | 3/1986 | Desai et al. | 395/275 |
| 4,644,532 | 2/1987 | George et al. | 370/112 |
| 4,750,136 | 6/1988 | Arpin et al. | 364/514 |
| 4,827,411 | 5/1989 | Arrowood et al. | 395/600 |
| 4,937,743 | 6/1990 | Rassman et al. | 395/115 |
| 4,937,825 | 6/1990 | Ballard et al. | 371/20.1 |
| 5,049,873 | 9/1991 | Robins et al. | 340/825.44 |
| 5,101,348 | 3/1992 | Arrowood et al. | 395/200 |

OTHER PUBLICATIONS

Brown Laure, "Graphical user Interface: a Developer's Quandary" *Patricia Seybold's Unix in the Office*, 1989.
Sandberg Russel, "The Pyschology of Network Management", *UNIX Review* 1990.
Kara et al, "An Architecture for Integrated Network Management", *IEEE* 1989 pp. 191–195.
Schnaidt Patricia, "Keep It Simple; SNMP Let You Manage a Heterogeneous Network Today", *LAN Magazine*, 1990.

*Primary Examiner*—Dale M. Shaw
*Assistant Examiner*—D. Dinh
*Attorney, Agent, or Firm*—Blakely, Sokoloff, Taylor & Zafman

[57] ABSTRACT

Apparatus for monitoring and displaying the status of a local area network. The network includes a hub with ports for connection to various data terminal equipment in a star configuration and for connection to other hubs of the network. The hubs each have different types of plug-in modules which have ports for connecting the hub to different types of network cable such as fiber optic cable, unshielded twisted pair cable and shielded twisted pair cable. Information is automatically provided to a control console identifying the types of modules and the location of the modules in the hub so that an image of the actual hub can be displayed on the screen of the control console. The actual hub image shows the location and types of modules installed in the hub. In addition, information regarding the connection of each of the hubs to other hubs of the network is obtained and provided to the control console. The information is processed so as to automatically produce a topology map on the control console display showing the overall topology of the network.

32 Claims, 19 Drawing Sheets

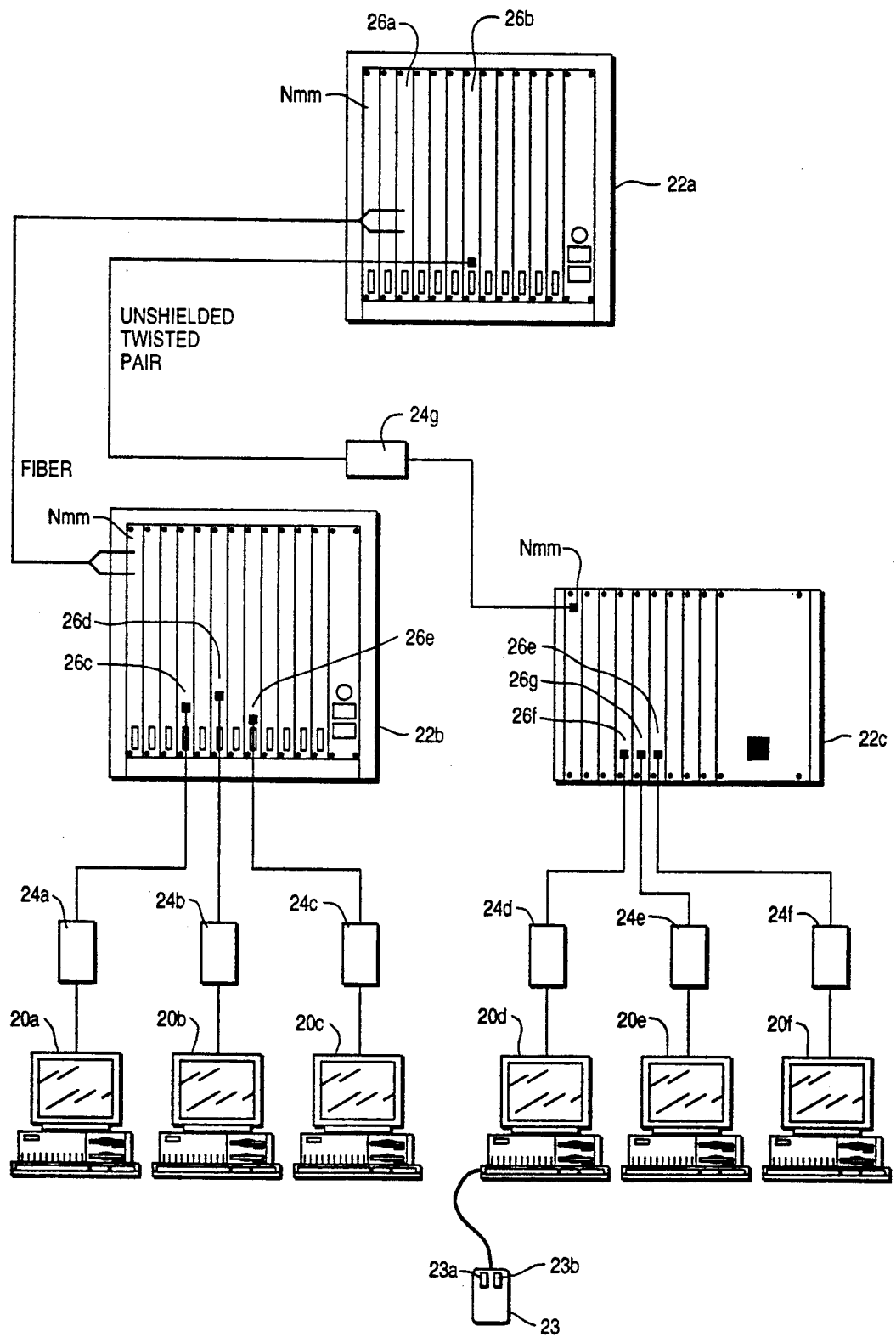

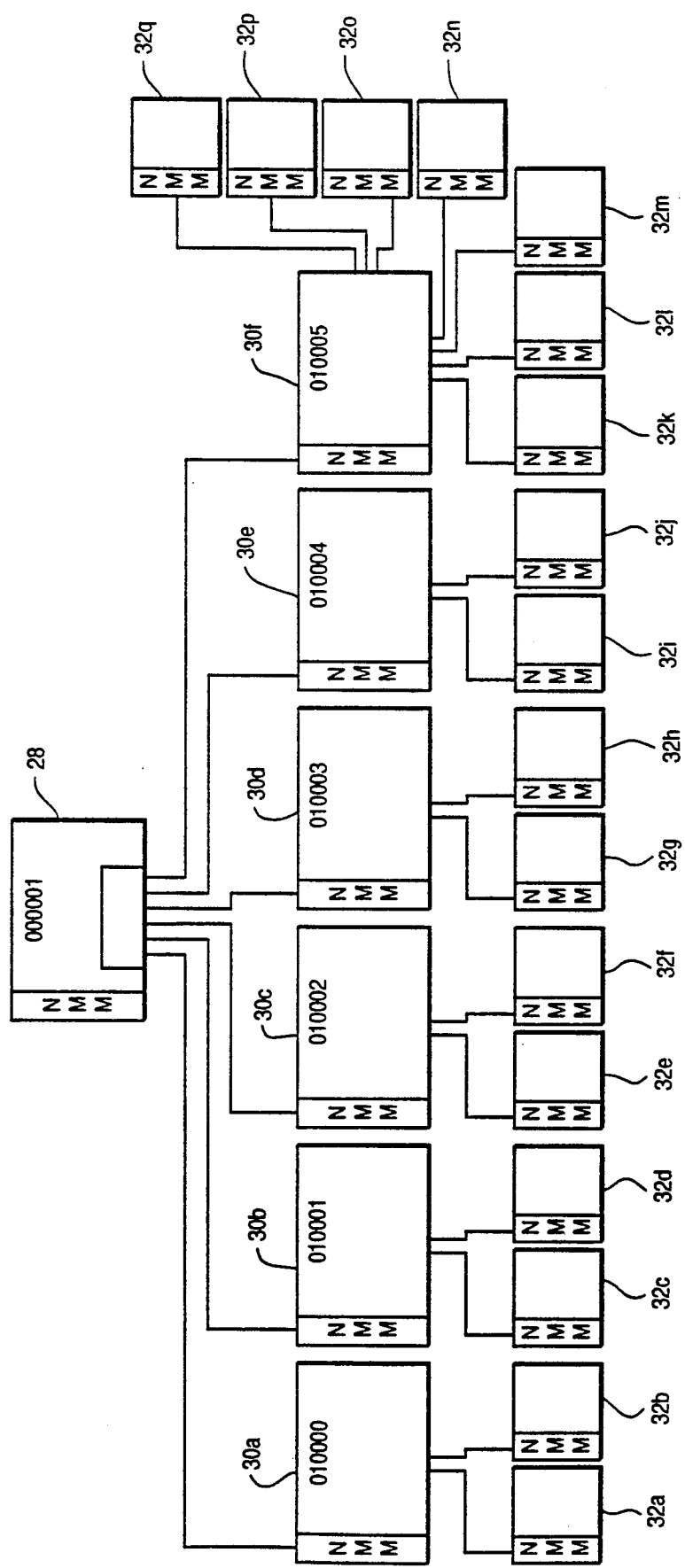

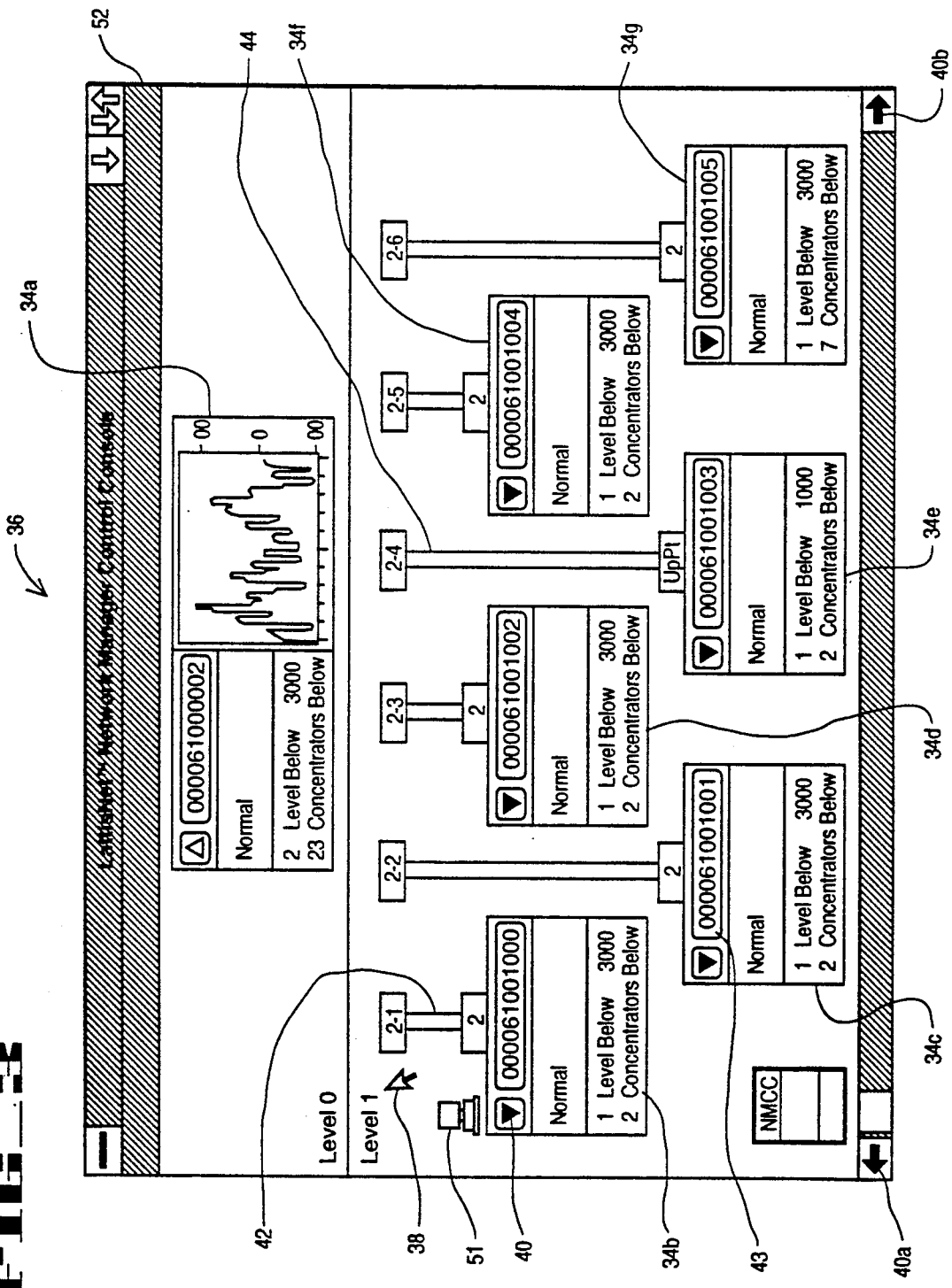

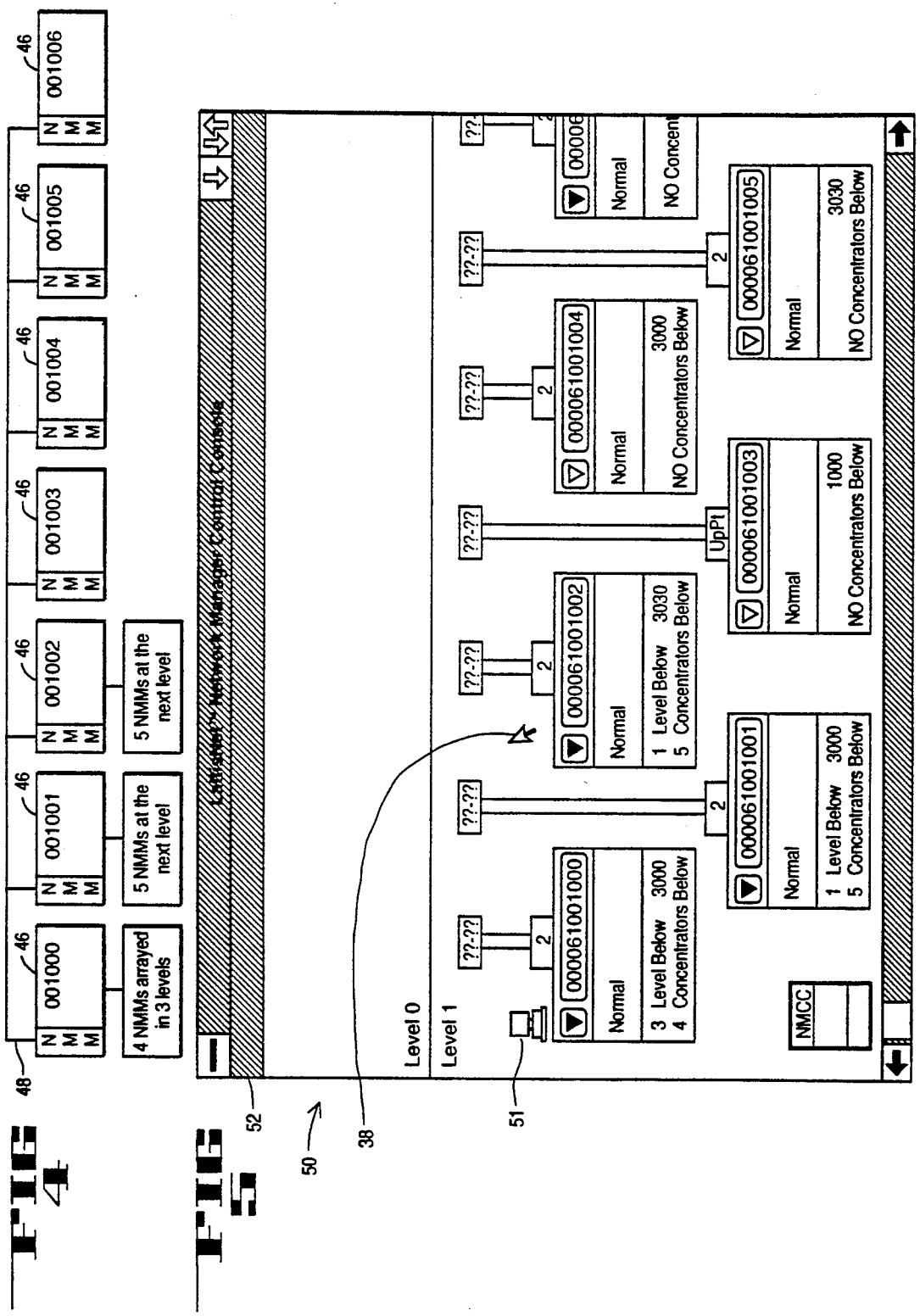

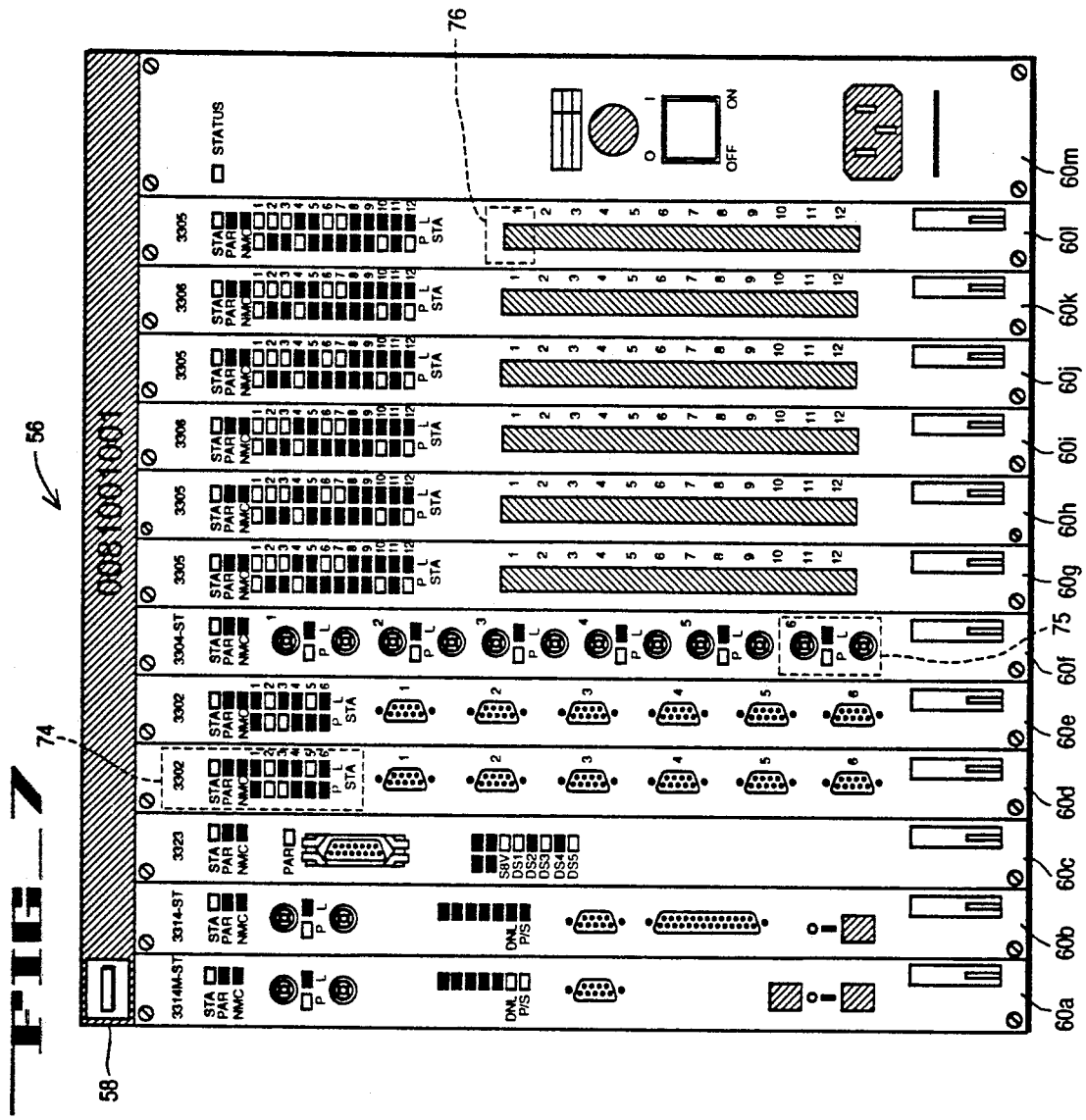

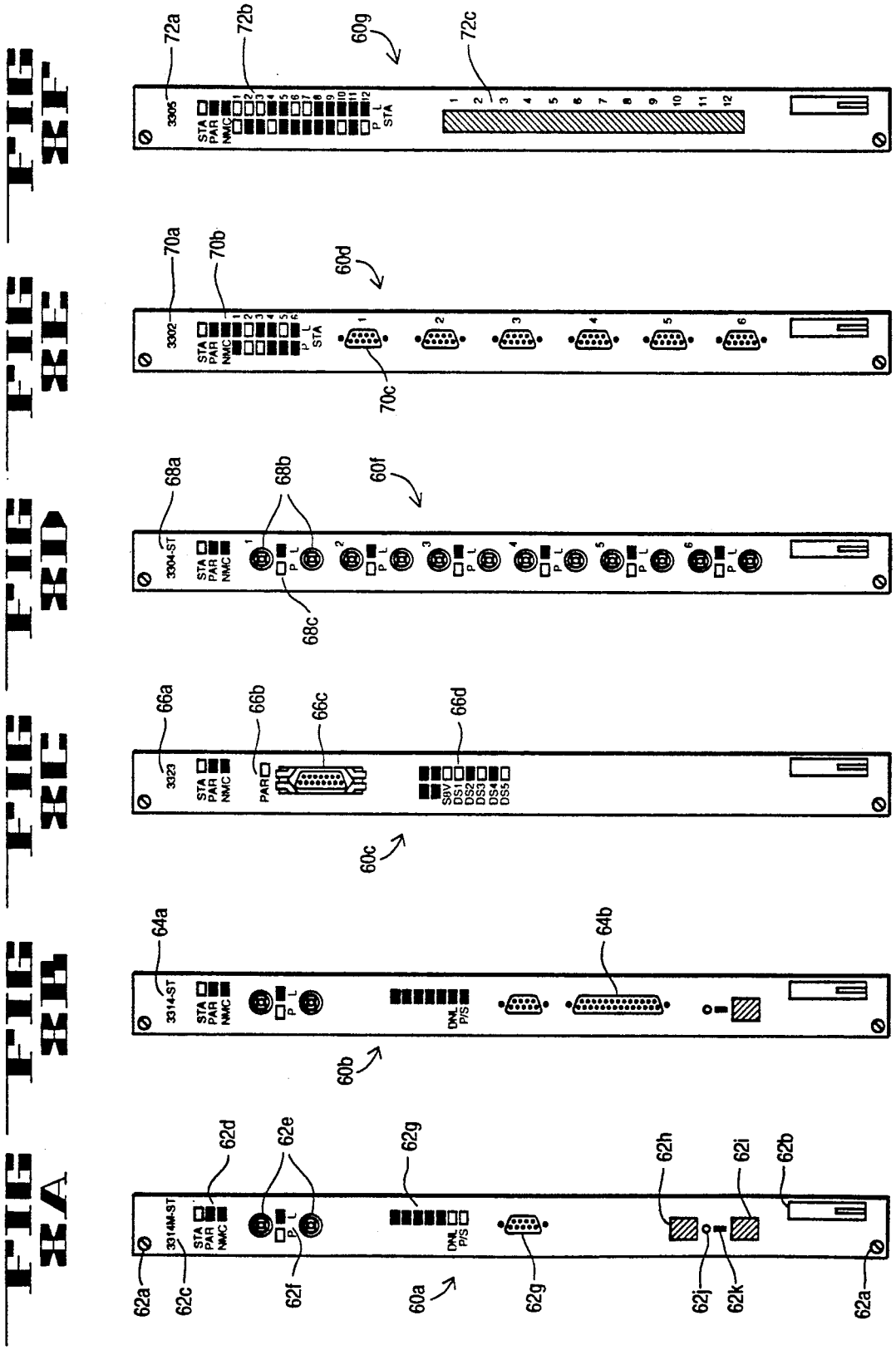

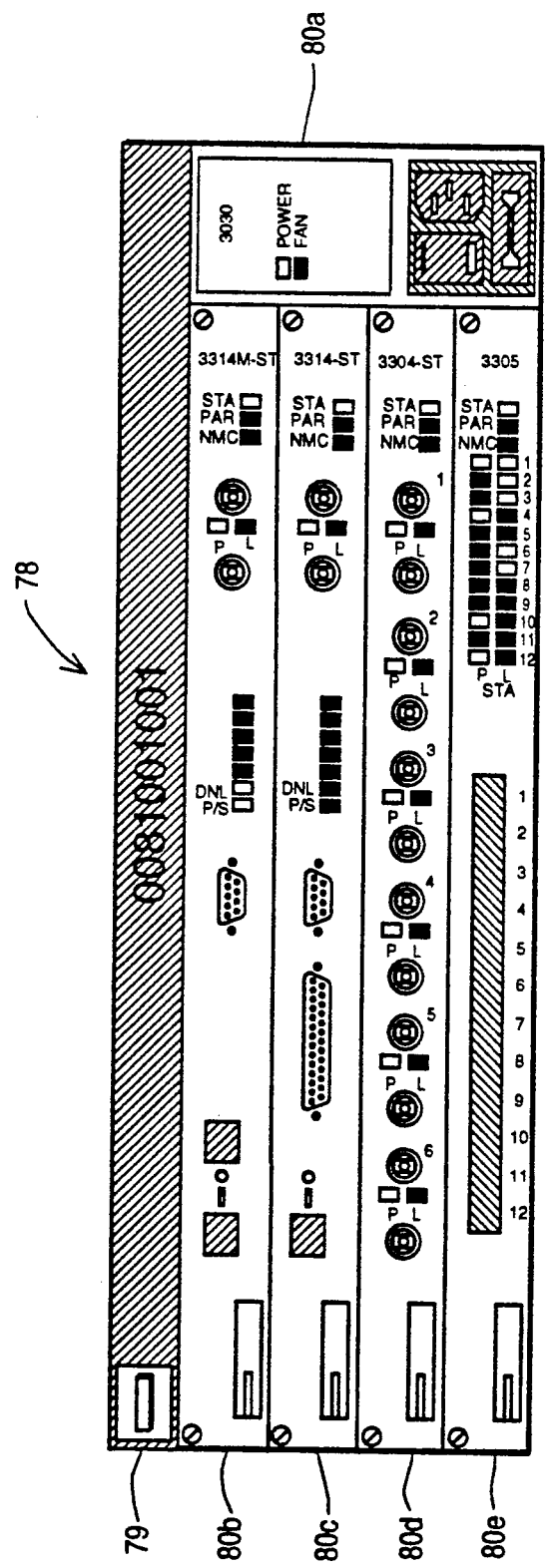
FIG_9

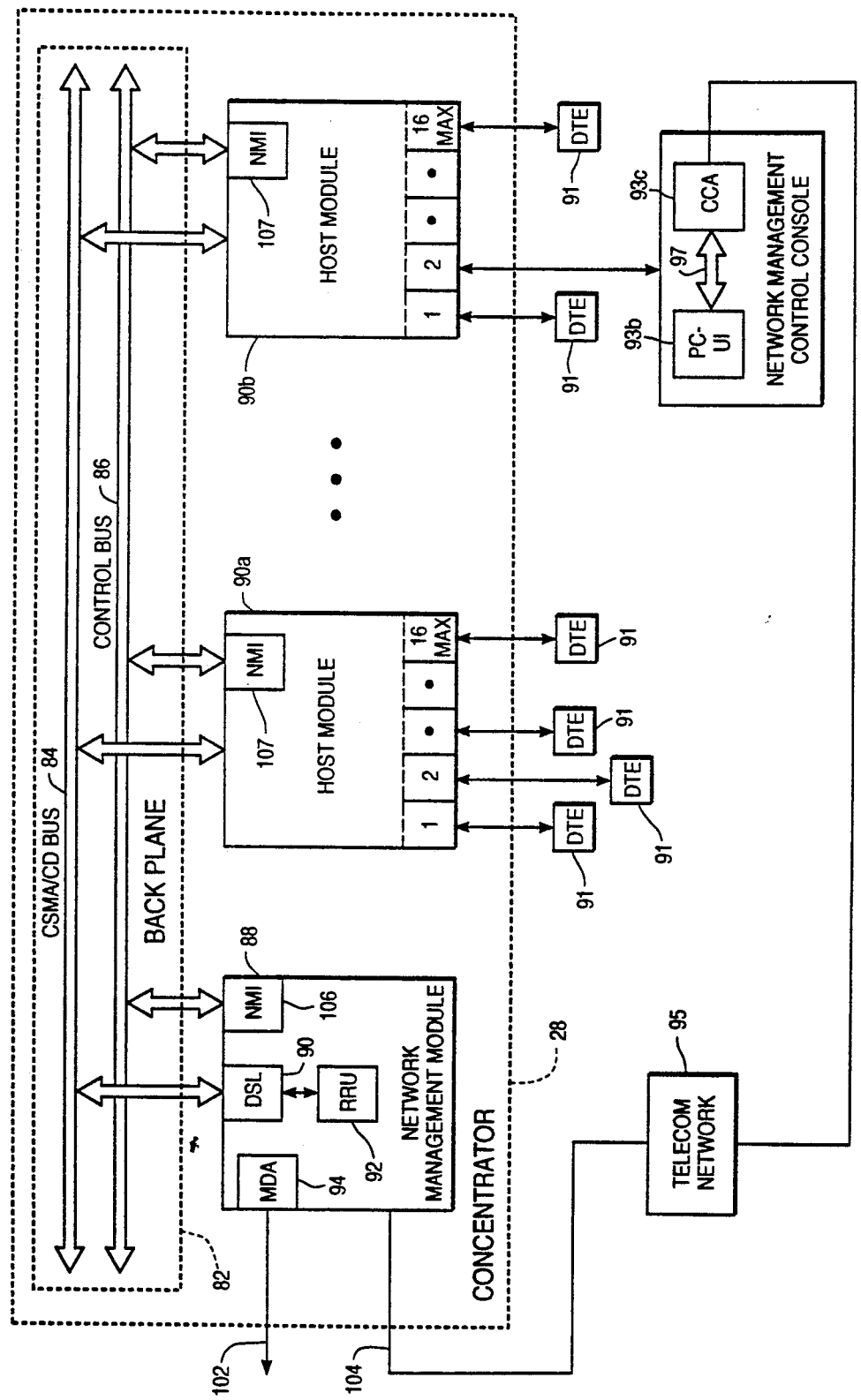
FIG_10

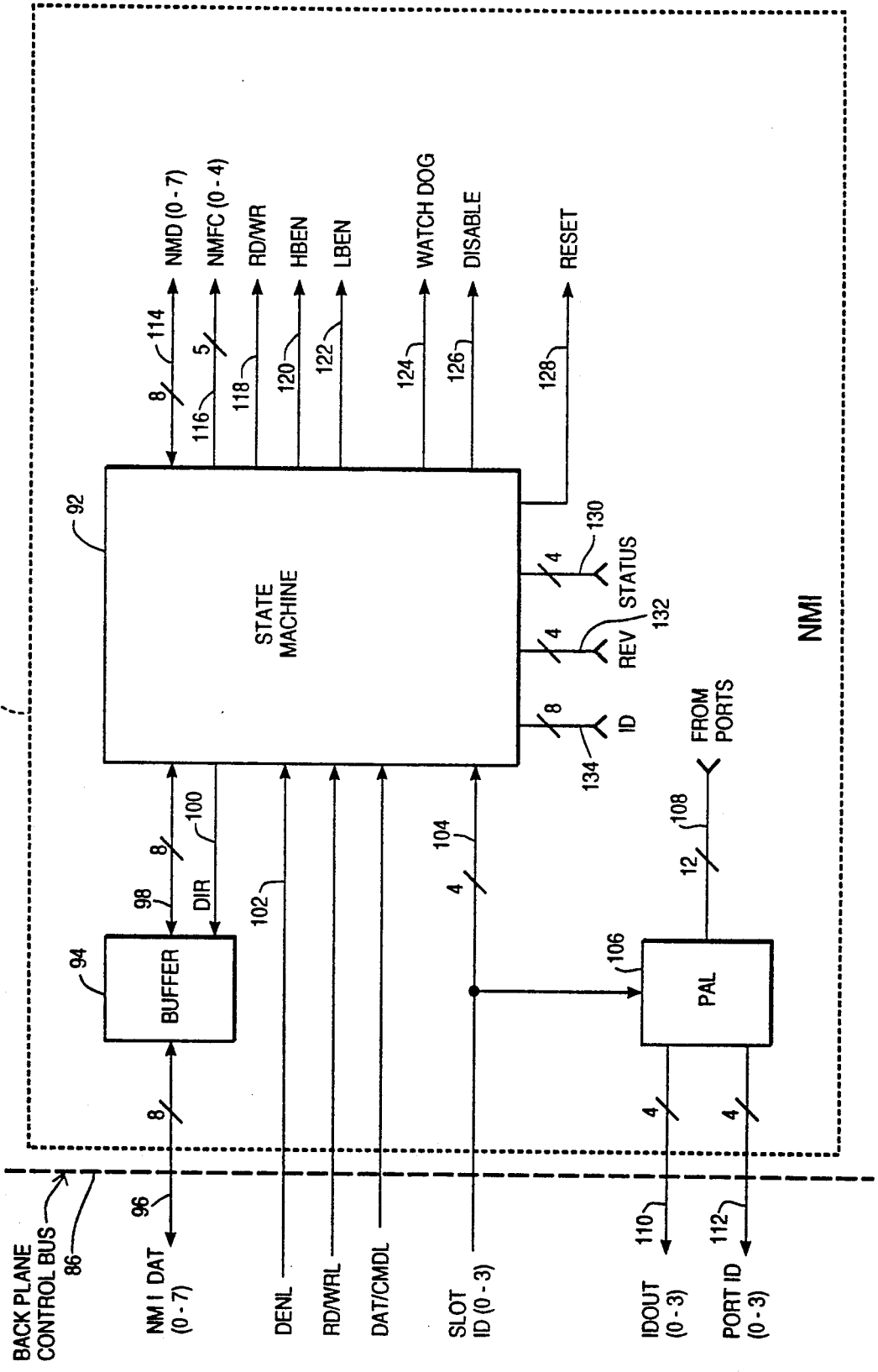
FIG_11

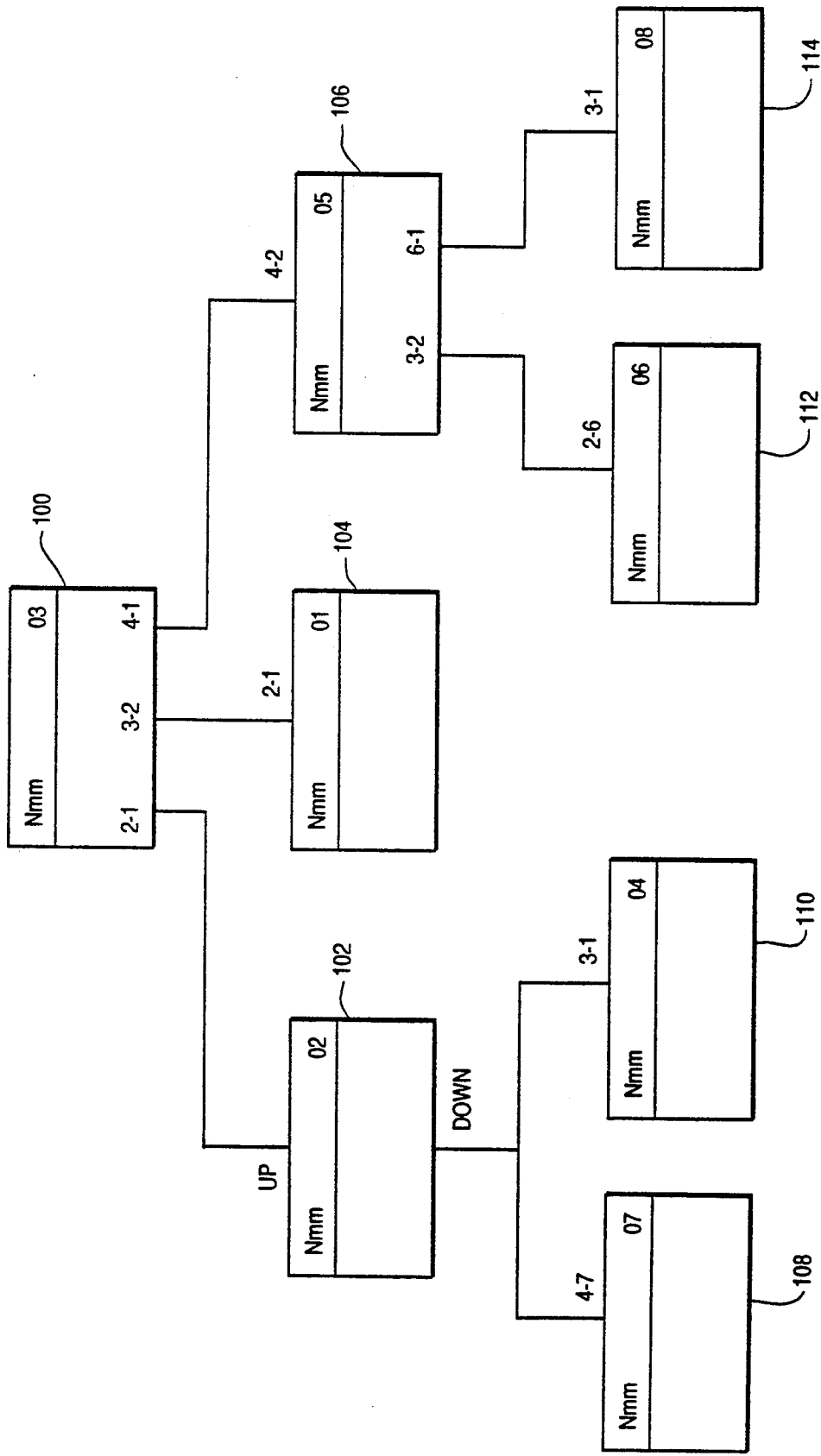
FIG_12

FIG_13 NETWORK MANAGEMENT MODULE (NMM) LIST

| REPORTING CONCENTRATOR ADDRESSES | LINK IDENTIFICATION | |
|---|---|---|
| | SLOT - PORT | CONCENTRATORS HEARD |
| 03 | 2 - 1 | 02, 07, 04 |
| | 3 - 2 | 01 |
| | 4 - 1 | 05, 06, 08 |
| 04 | 3 - 1 | 01, 02, 03, 05, 06, 07, 08 |
| 01 | 2 - 1 | 02, 03, 04, 05, 06, 07, 08 |
| 08 | 3 - 1 | 01, 02, 03, 04, 05, 06, 07 |
| 06 | 2 - 6 | 01, 02, 03, 04, 05, 06, 07, 08 |
| 05 | 3 - 2 | 06 |
| | 6 - 1 | 08 |
| | 4 - 2 | 03, 01, 02, 04, 07 |
| 02 | DOWN | 07, 04 |
| | UP | 01, 03, 05, 06, 08 |
| 07 | 4 - 7 | 01, 02, 03, 04, 05, 06, 08 |

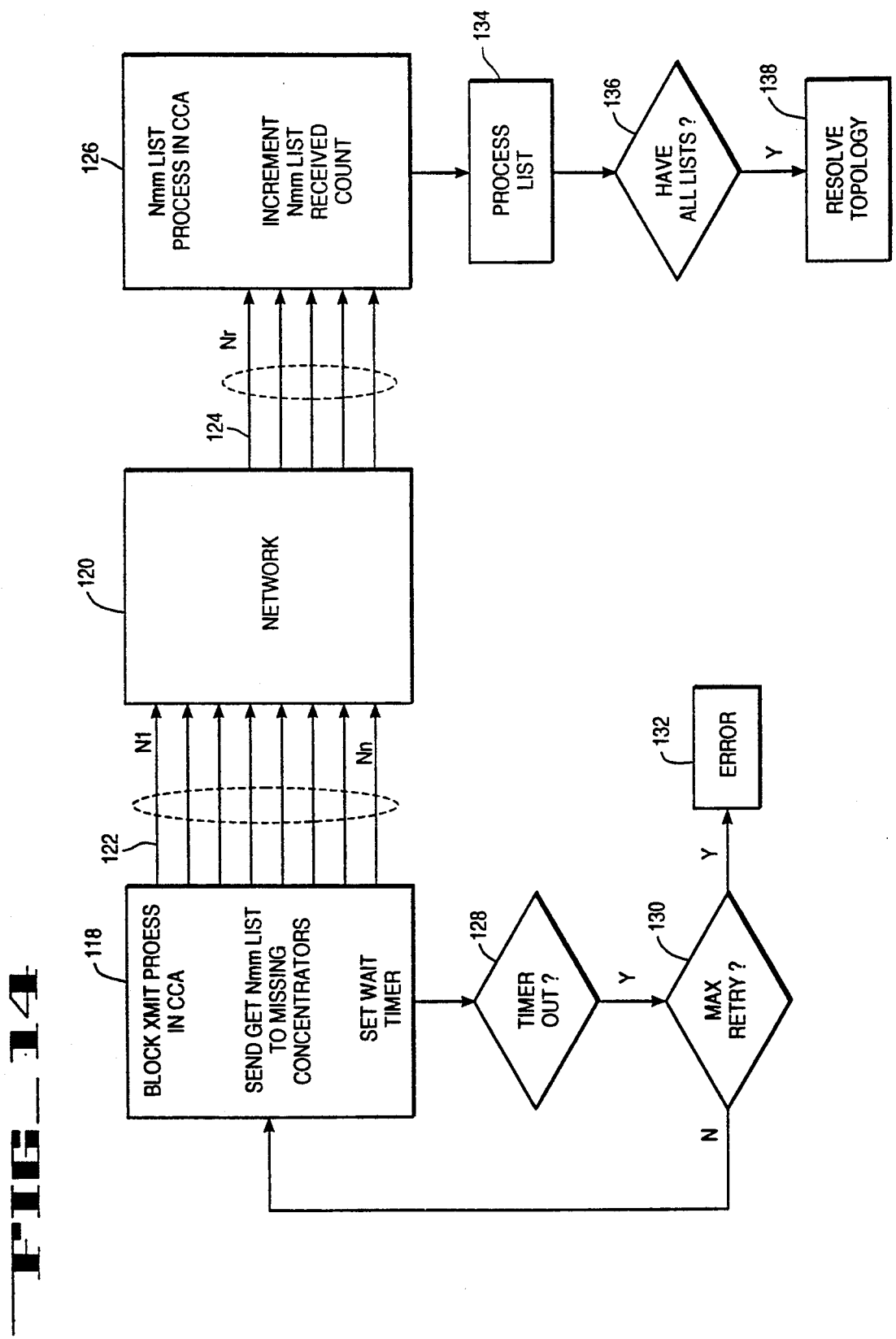

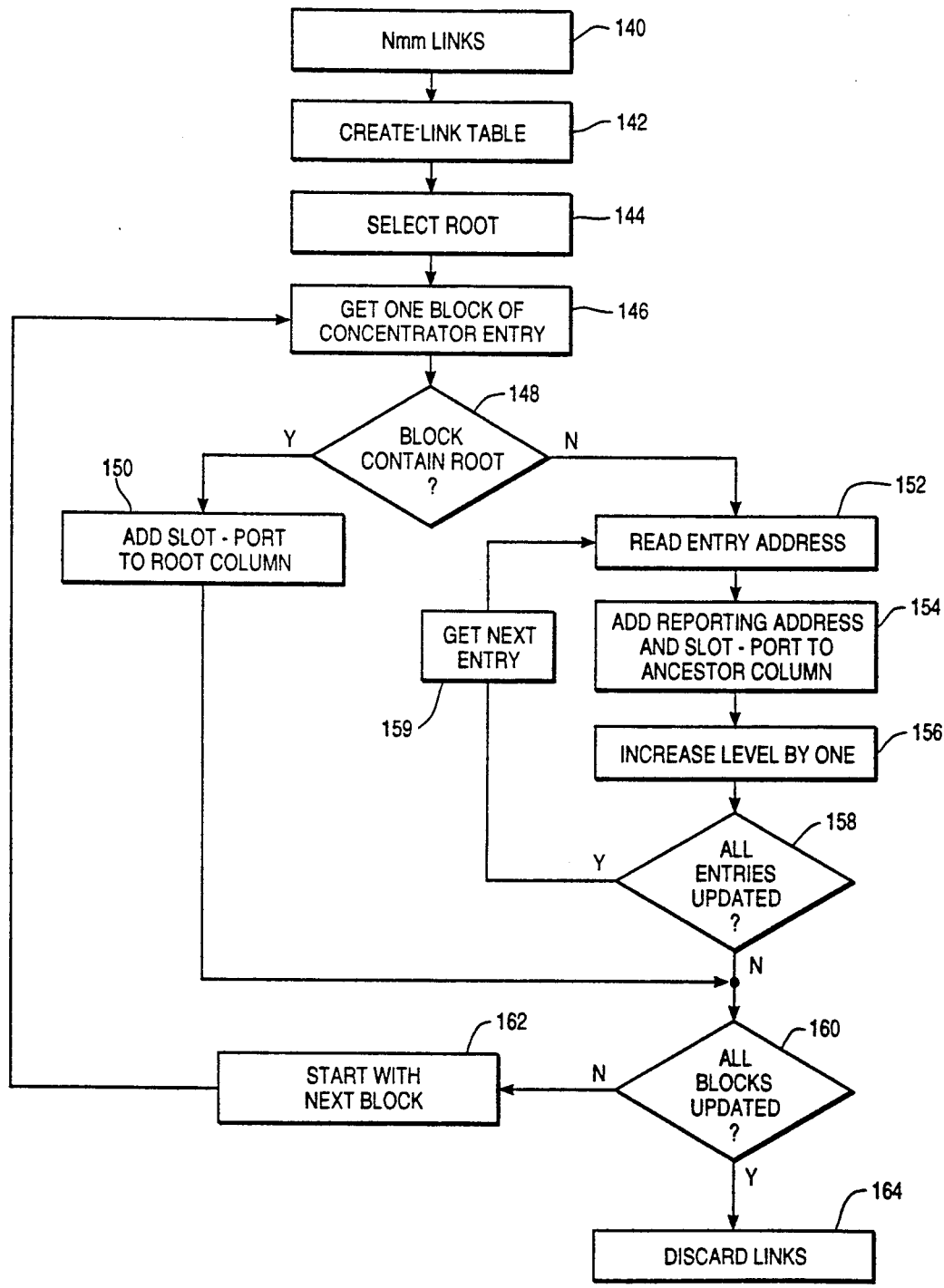

FIG_16

ANCESTOR TABLE

| THIS CONCENTRATOR | | | ANCESTOR | | | ANCESTOR | | ANCESTOR | |
|---|---|---|---|---|---|---|---|---|---|
| ADDRESS | OWN SLOT-PORT | LEVEL | ADDRESS | SLOT-PORT | | ADDRESS | SLOT-PORT | ADDRESS | SLOT-PORT |
| 01 | 2-1 | 2 | 02 | UP | | 03 | 3-2 | | |
| 02 | — | 0 | — | — | | — | — | — | — |
| 03 | 2-1 | 1 | 02 | UP | | | | | |
| 04 | 3-1 | 1 | 02 | DOWN | | | | | |
| 05 | 4-2 | 2 | 02 | UP | | 03 | 4-1 | | |
| 06 | 2-6 | 3 | 02 | UP | | 05 | 3-2 | 03 | 4-1 |
| 07 | 4-7 | 1 | 02 | DOWN | | | | | |
| 08 | 3-1 | 3 | 02 | UP | | 05 | 6-1 | 03 | 4-1 |

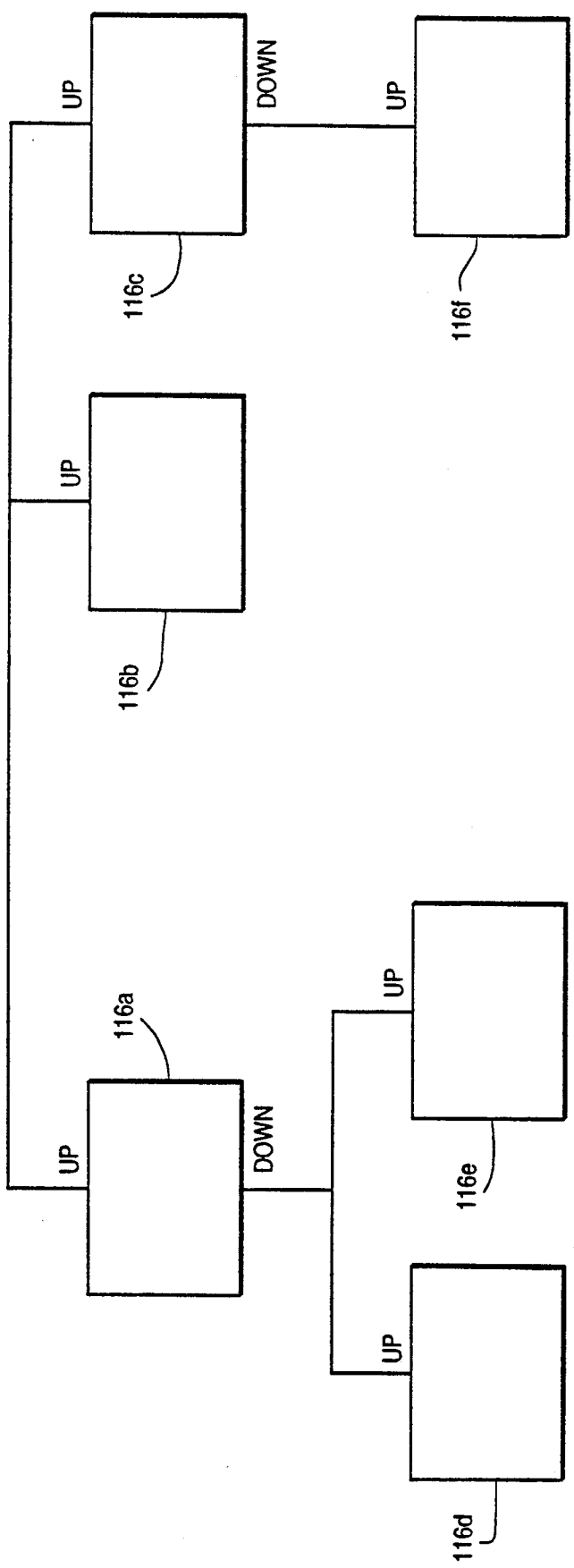
FIG_17

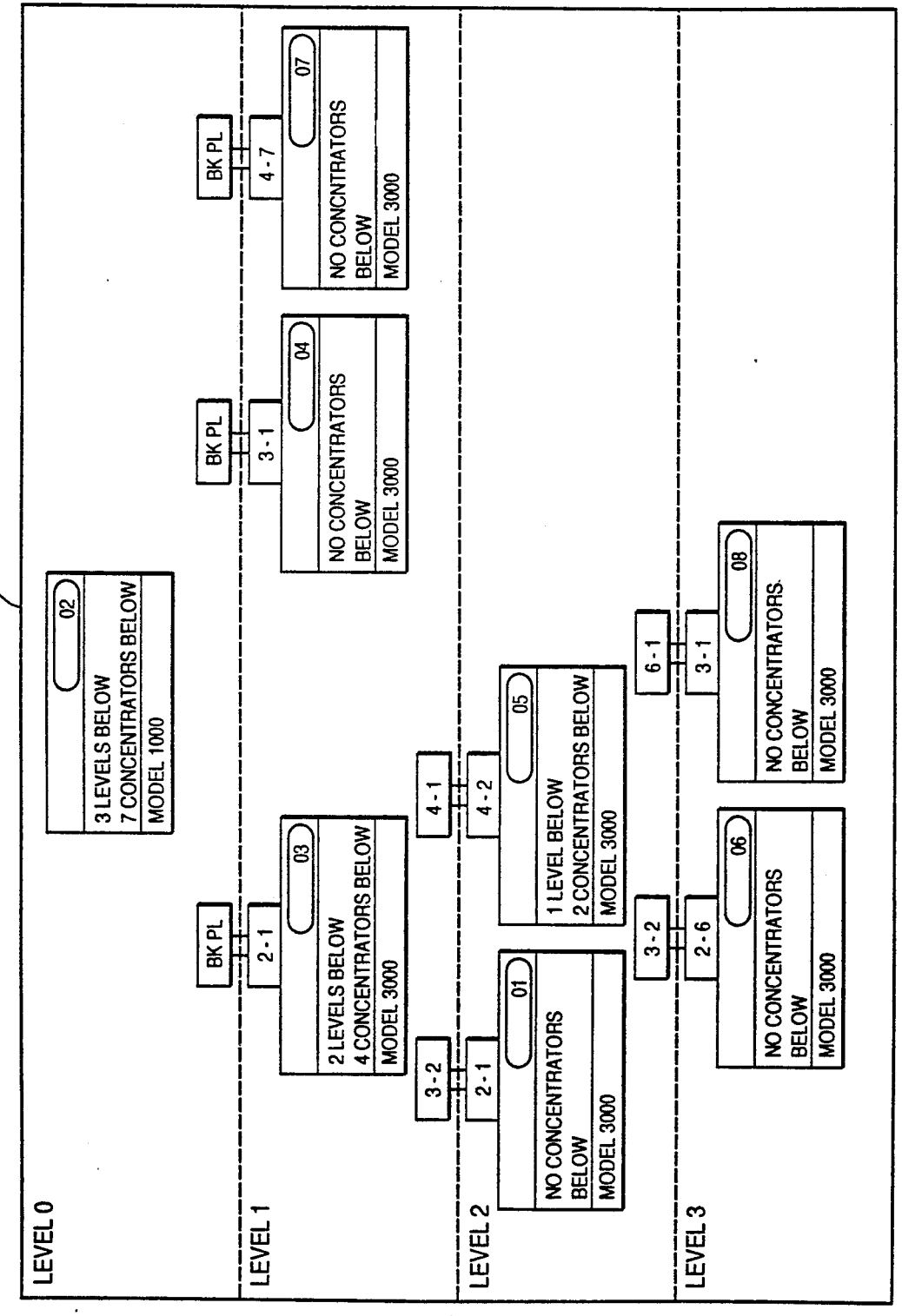

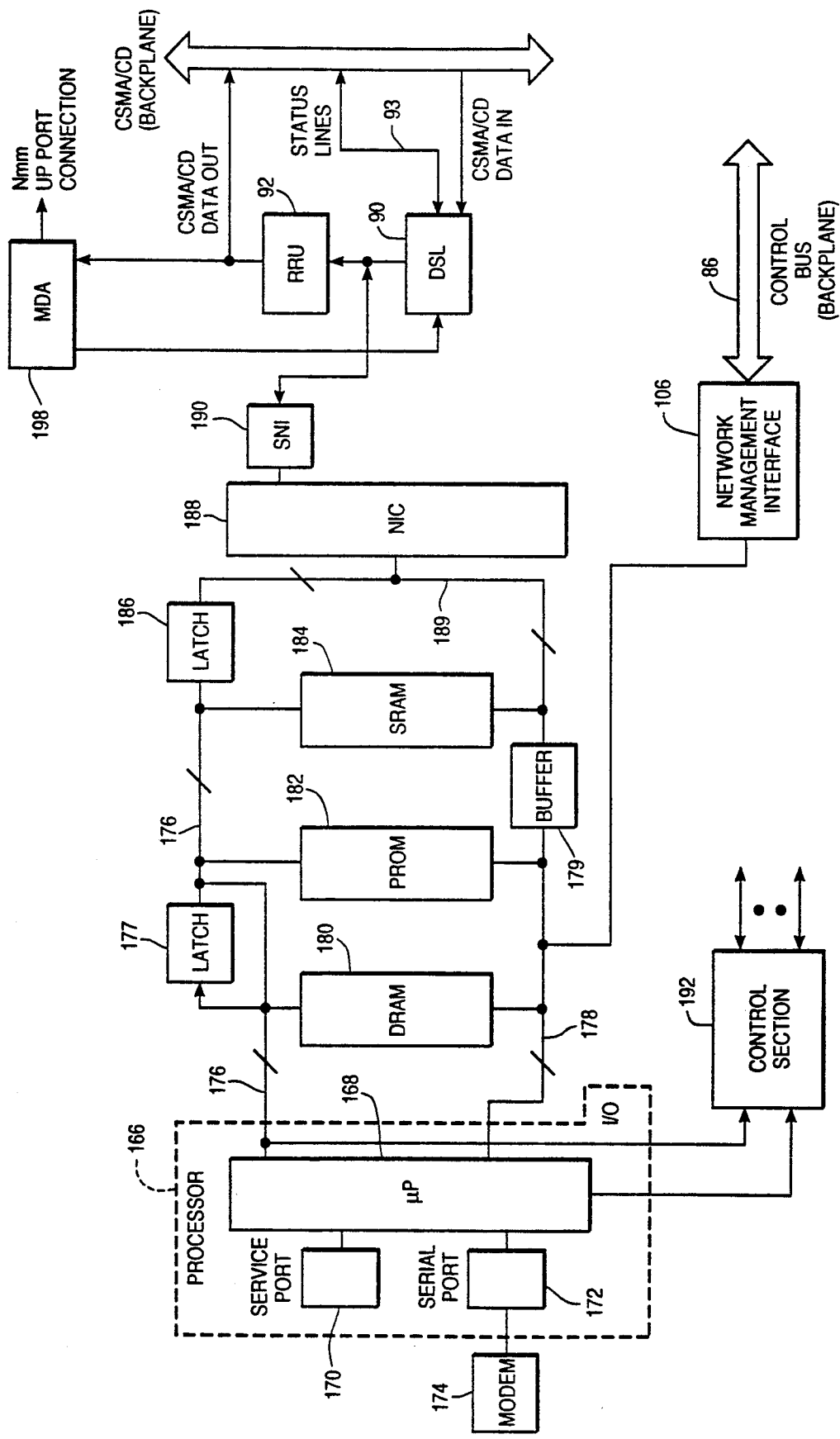

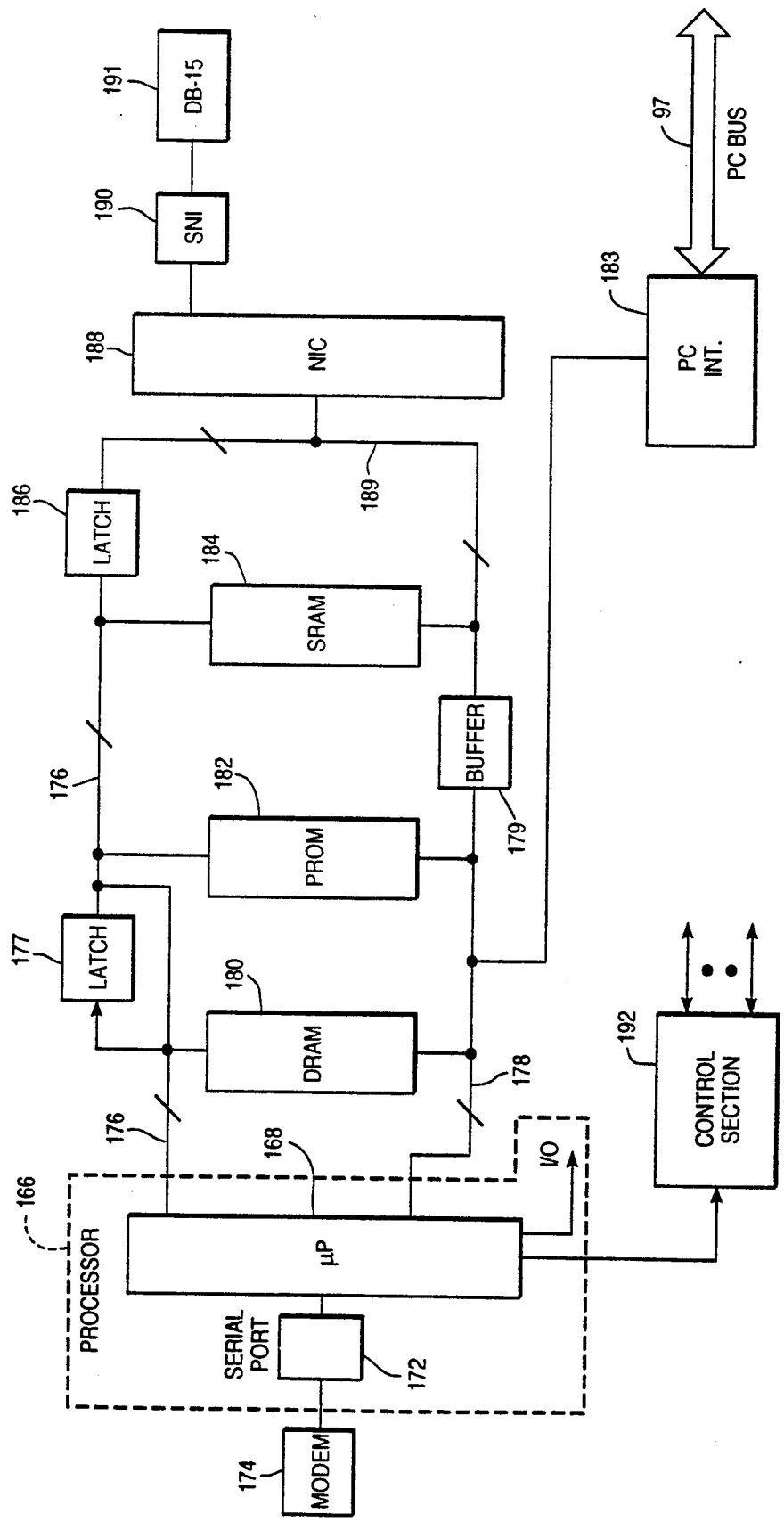
FIG_20 CONTROL CONSOLE ADAPTOR

FIG_21A
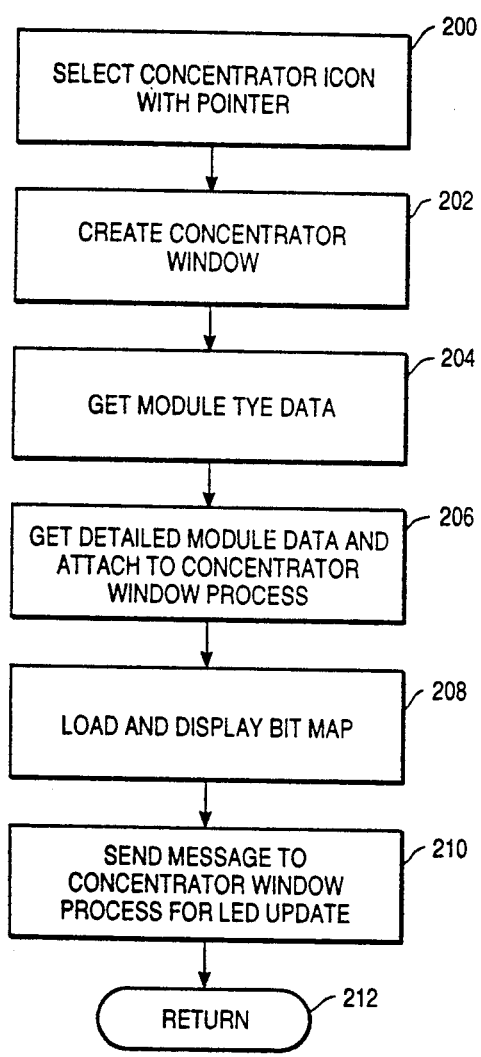
FIG_21B
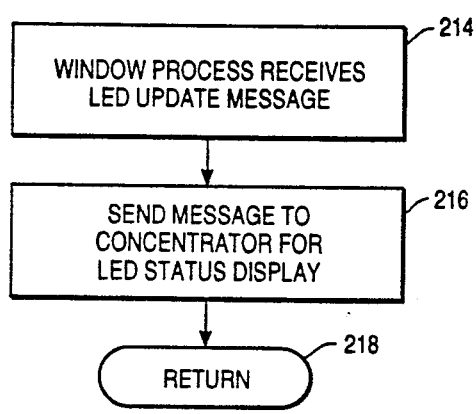
FIG_21C
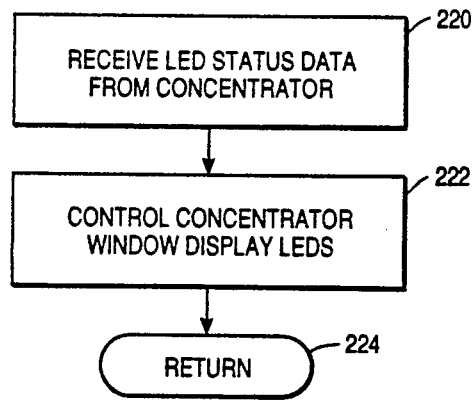

APPARATUS AND METHOD OF MONITORING THE STATUS OF A LOCAL AREA NETWORK

BACKGROUND OF THE INVENTION

1. Field of the Invention

The present invention relates generally to local area networks and more particularly to apparatus and methods for monitoring the status of a local area network by producing a topology map of the network configuration and by producing a control console display image depicting the appearance of selected network hubs.

2. Background Art

Local area networks for interconnecting data terminal equipment such as computers are well known in the art. Such networks may include a large number of components which may be configured in a variety of ways.

Although equipment exists for monitoring the status of local area networks, such equipment is not capable of accurately monitoring and reporting network status in a manner which may be readily interpreted. For example, the network may include a large number of hubs or concentrators, each of which form the center of a star configuration. The concentrators may each be capable of servicing a large number of data terminal equipment such as personal computers. The network medium may be shielded twisted pair cable, unshielded twisted pair cable or fiber optic cable or a combination of all three. Further, each type of cabling may be supported by various types of modules located in each of the concentrators.

None of the conventional apparatus for monitoring and displaying the status of a network are capable of conveying the actual status of the network in a manner which can be easily comprehended by a user. The disclosed apparatus and method overcomes such limitations and allow the actual status of the network to be automatically monitored and displayed. The information displayed depicts in great detail the status of a network which can be easily comprehended by individuals with a minimum amount of training even if the network is relatively complex. Further, the status of the network is automatically updated. These and other advantages of the present invention will become apparent to those skilled in the art upon a reading of the Detailed Description of the Preferred Embodiment together with the drawings.

SUMMARY OF THE INVENTION

Apparatus and a method of monitoring the status of a local area network are disclosed. The network typically includes a plurality of hubs, such as concentrators, with each hub having data ports for coupling the hub in a star configuration to either data terminal equipment, such as personal computers, or for coupling the hub to another hub of the network. The network is of the type which utilizes network contention control such as the well known Carrier Sense Multiple Access With Collision Detection (CSMA/CD).

In one embodiment of the invention, the apparatus automatically determines the overall topology of the network, with the hubs having at least three data ports each. The apparatus includes a transmit means associated with each of the hubs having both originate and repeat means. The originate means functions to transmit messages over the network which originate at the associated hub and which contain an identifying address of the associated hub. The repeat means functions to transmit messages received by the associated hub over the network which originated from other hubs of the network.

Each of the hubs further includes port identifying means for identifying which of the data ports has received one of the messages transmitted by another hub of the network. In this manner, topology data regarding the connection of the various ports of the associated hub to other hubs of the network are obtained. The topology data from a single hub usually does not contain enough information to ascertain the overall network topology.

The apparatus further includes control means coupled to the network for receiving the topology data from each of the hubs in the network. The topology data identify a particular one of the data ports of the hub reporting the topology data and address of the other ones of the hubs which originated network messages received by the reporting hub over that particular port. Finally, the apparatus includes processing means for determining the overall topology of the network utilizing the received topology data.

In another embodiment of the invention, the apparatus monitors the status of each of the hubs of a star configured network by producing an image, on a control console display for example, which depicts the appearance of the actual hub.

Each hub of the network includes a chassis for receiving a plurality of modules. The modules have at least one port for connecting the data terminal equipment such as a computer to the hub, with the modules being of varying types. For example, some modules may be adapted for use with unshielded twisted pair cables and other modules may be adapted for use with optical cables.

The apparatus includes location means for producing location data indicative of the location of each of the modules in the hub chassis. An exemplary location means would include hard-wired slot identification bits located on the chassis which are transferred to any module inserted into the chassis slot associated with the hard-wired bits. Type means are further included for producing type data indicative of the type of each of the modules in the hub. An exemplary type means would include hard-wired bits on the module which indicate the type of module.

Finally, the apparatus includes display means for producing an image of the hub utilizing the location data and the type data, with the image depicting the location of the modules in the hub and the type of modules.

BRIEF DESCRIPTION OF THE DRAWINGS

FIG. 1 is a diagram of an exemplary local area network of the type in which the subject invention can be used and which includes three concentrators or hubs and associated data terminal equipment.

FIG. 2 is a schematic diagram of a local area network, having twenty-four concentrators, of the type in, which the subject invention can be used.

FIG. 3 is an exemplary display produced in accordance with the present invention depicting a selected portion of the topology of the network of FIG. 2.

FIG. 4 is a schematic diagram of a local area network with the upper level concentrators connected to a common coaxial cable.

FIG. 5 is an exemplary display produced in accordance with the present invention depicting a selected portion of the topology of the network of FIG. 4.

FIG. 6 is a section of a display menu showing a portion of a main menu bar and an exemplary selected submenu.

FIG. 7 is a section of a display showing a detailed view image which depicts the actual appearance of the front panel of a selected network concentrator, including the location of modules in the concentrator and the type of modules.

FIGS. 8A-8F are enlarged views of selected portions of the FIG. 7 image showing details of the various type of modules.

FIG. 9 is similar to FIG. 7 except that another style of concentrator is depicted.

FIG. 10 is a block diagram of one of the network concentrators showing the network management module and host modules all connected to a common concentrator backplane together with various data terminal equipment in the network management control console connected to the concentrator.

FIG. 11 is a block diagram showing the network management interface for the host modules for interfacing the modules to the concentrator backplane.

FIG. 12 is a block diagram of a further exemplary network showing the interconnection of the concentrators of the network.

FIG. 13 is a Network Management Module List showing the various ports of each of the concentrators and the addresses of the other concentrators which transmit messages received over the ports.

FIG. 14 is a flow chart depicting the process whereby the link data are obtained from the concentrators to construct the FIG. 13 List.

FIG. 15 is a flow chart depicting the process whereby the link data of the FIG. 13 List are processed, to form the Ancestor Table of FIG. 16.

FIG. 16 is a Ancestor Table constructed from the data contained in the FIG. 13 List.

FIG. 17 is a block diagram of a network where the up port of the highest level concentrators are connected together so that no concentrator will be assigned the Level 0 position of the topology display.

FIG. 18 is a simplified display image of the overall topology of a network based upon the data of the FIG. 16 Ancestor Table.

FIG. 19 is a functional block diagram of the network management module located in each of the network concentrators.

FIG. 20 is a functional block diagram of the control console adapter, the adapter being an expansion card used to convert a personal computer to a network management control console.

FIGS. 21A-21C are flow charts depicting the process for producing the detailed view of the concentrators such as depicted in FIGS. 7 and 9.

DETAILED DESCRIPTION OF PREFERRED EMBODIMENT

Referring to the drawings, FIG. 1 is a diagram showing the physical connection of a typical simplified local area network. The depicted network function to interconnect six personal computers or PCs 20a-f. The network includes three concentrators 22a, 22b and 22c. The concentrators function as a hub in the star network topology and provide basic Ethernet functions. Many of the details which will be provided regarding the network are exemplary only, it being understood that the present invention may be utilized in connection with a wide variety of communication networks.

Each of the concentrators includes several plug-in modules 26 which connect to a backplane (not depicted) of each concentrator 22. There are various types of modules including host modules which have ports for connecting the associated module to data terminal equipment (DTE). For example, concentrator 22b includes a host module 26c having a port (not designated) connected to personal computer 20a by way of an interface device 24a. Device 24a is a transceiver (transmitter/receiver) used to link the computer 20a (DTE) or node to the network cable. Module 26c will typically have several other ports (not depicted) for connecting to other DTEs.

One of the DTEs, such as personal computer 20d, is designated as the network management control console (NMCC). The designated computer 20d is provided with a control console adapter (CCA), which is an expansion board which adapts the computer for use as a control console. As will be explained, a user can perform various network monitoring and control functions at the NMCC. A pointer device, such as a mouse 23 having primary and secondary control buttons 23a and 23b, respectively, is used for carrying out these functions.

Each concentrator 22a, 22b and 22c is provided with a network management module (NMM). The network management module NMM gathers data received on a port of a host module and transmits the data to other modules in the concentrator. Further, the network management module NMM will forward the received data to other concentrators in the network that may be connected to the concentrator.

The foregoing can be further illustrated by way of example. Assume the personal computer 20e has a message for computer 20b. Each computer or node in the network has an associated address. Messages directed to a particular computer will be decoded by a conventional network controller card installed in the computer and, if the destination address in the message matches the computer address, the message will be processed by the computer. The message originating from computer 20e will include a destination address of computer 20b. The message will be transmitted to the associated transceiver 24e and will be received by a port (not designated) on host module 26g of concentrator 22c. Module 26g will transmit the received message to the network management module NMM in concentrator 22c by way of the concentrator backplane (not depicted).

The NMM will transmit the received message to each host module in concentrator 22c, including modules 26f, 26g and 26e. The message will exit each port of each module and will be received by transceiver 24d and 24f (but not 24e which received the message originating from computer 20e). However, since the destination address does not match the address of computers 20d and 20f, the network controller cards installed in computer 20d and 20f will not process the messages.

The NMM in concentrator 22c will also forward the received message to concentrator 22a by way of transceiver 24g. The message will be received by a port in module 26d and by the NMM in concentrator 22a. The NMM of concentrator 22a will transmit the message to the NMM of concentrator 22b. The NMM of concentrator 22b will transmit the message to each module in concentrator 22b so that the message will be received by transceivers 24a, 24b and 24c. Since transceiver 24b has an address which matches the destination address, transceiver 24b will forward the message to the associated computer 20b. The other two transceivers 24a and 24c connected to concentrator 22b will refrain from forwarding the message.

Since each message received by a concentrator is retransmitted, only a single message can be transmitted over the network at one time. In the event two computers attempt to transmit at the same time, the messages will interfere and cause a collision in the network. As is well known, when a collision on the network occurs, the concentrator connected to the two cables on which the collision occurred will detect the presence of the collision.

When a collision is detected by an NMM, a "jam" signal will be transmitted by the NMM of the concentrator over the network. The computers involved in the collision will detect the presence of the collided signals and will resort to statistical contention for the network. Other computers not involved in the collision will sense the carrier signal and refrain from transmitting on the network.

Eventually, the jam signal will disappear and the computers will contend for access to the network. A computer wishing to transmit first listens for message traffic on the network and transmits only if there is no traffic and only in the absence of any other carrier signal. This well known method of providing access to a common local area network medium is referred to as Carrier Sense Multiple Access with Collision Detection or CSMA/CD.

The network depicted in FIG. 1 is relatively small and includes two levels of concentrators. Concentrator 22a is at the top level (level "0") and concentrators 22b and 22c are at the next from top level (level "1"). It would be possible to connect several additional DTEs, including computers, work stations, servers, and the like to the concentrators 22a, 22b and 22c. Further, additional concentrators could be connected to the exiting concentrators.

FIG. 2 shows how a much larger network consisting of twenty three concentrators. None of the port connections to the individual host modules in the concentrators are shown. Concentrator 28 is the top level, or level "0" concentrator. Concentrator 28 is connected to the next from top level, or level "1" concentrators 30a-30f. The six level 1 concentrators are connected to a total of seventeen level 2 concentrators 32a-32g. Note that a lower level concentrator can be connected to a higher level concentrator by way of a connection to the network management module NMM of the lower level concentrator. It is also possible to connect the higher level concentrator to a host module port in the lower level concentrator.

The network management module NMM performs monitoring and controlling functions within the concentrator in which it is located. In addition, the NMM sends status and diagnostic reports to the network management control console NMCC. Further, the NMM executes commands issued by the control console.

One important function of the network management control console NMCC is to monitor the network topology. As previously noted, the NMCC is a designated computer of the network which includes a control console adapter CCA in the form of an expansion board which is installed in the computer. The designated computer uses a graphical user interface, such as a commercially-available software package called Microsoft Windows sold by Microsoft Corporation of Redmond, Wash. Other commercially available software packages which provide a window environment similar to Microsoft Windows could be used for the present application.

A principal function of the network management control console NMCC is to monitor the status of the network topology. An important feature of the present invention is the ability to automatically acquire information regarding the topology of the network so that a display of the topology can be generated and automatically updated to reflect changes in the network.

FIG. 3 is an image, generally designated by the numeral 36, which will be produced on the NMCC video display terminal showing the topology of the exemplary network depicted in FIG. 2. The display is a menu-driven graphics display which uses a pointing device such as a mouse, light pen or the like. Referring to FIG. 3, the rectangular boxes depicted in the display are concentrator icons 34a-34e 34e which represent the concentrators in the network. The screen is only capable of displaying a relatively limited number of concentrator icons at a time. Accordingly, it is necessary to scroll the display to depict all twenty four of the concentrators, as will be explained.

Concentrator icon 34a corresponds to concentrator 28 in FIG. 2. Icons 34b-34g represent concentrators 30a-30f of FIG. 2. The icons representing the remaining concentrators 32a-32g can be viewed only by scrolling the display both horizontally and vertically.

Display 36 is split between a "Level 0" and a "Level 1". Concentrator icon 34a is shown in the upper "level 0", with the remainder of the icons located in the lower half or "level 1" portion of the screen. The display can be scrolled vertically by placing the cursor icon or mouse pointer 38 over one of the triangle-shaped elements 40 and "clicking" on actuating the control button mouse. When the mouse is clicked, the display will replace the "Level 0" icon at the top with the level "1" icons and replace the "Level 1" icons at the bottom with "Level 2" icons. Since there are a total of seventeen "Level 2" concentrators 32a-32g (FIG. 2), it will be necessary to scroll the display horizontally to view all of these concentrators. Scrolling to the left is accomplished by "clicking" left arrow symbol 40a using the mouse and scrolling to the right is accomplished by "clicking" right arrow symbol 40b using the mouse.

Concentrator icon 34a displays various information regarding the status of concentrator 28 (FIG. 2). The chart recorder image displays the amount of message traffic received by the concentrator over time. The designation "000081000002" represents the concentrator identification or address. The designation "Normal" indicates the overall status of the concentrator. The designation will change to indicate a fault or warning condition.

The designation "2 Levels Below" on icon 34a indicates that two levels of concentrators are located below the "Level 0" of concentrator 28, namely "Level 1" and "Level 2". The designation "3000" indicates the type of concentrator. Other concentrators, such as the concentrator 34e, are Model "1000" type concentrators, which have fewer capabilities than do Model "3000" concentrators. Finally, the designation "23 Concentrators Below" indicates that there are twenty three concentrators connected either directly to concentrator 28 or indirectly to concentrator 28 through other concentrators.

Each concentrator icon in the lower part of the display 36, in this case the "Level 1" part of the display, has a vertical bar referred to as a linkage bar. The linkage bar such as bar 42 above icon 34b indicates the connection between the concentrator and the parent of the concentrator located in the next higher level.

The information depicted by the linkage bar and associated text depends upon the type of concentrator. For example, linkage bar 42 depicts the connection between the Level 1 Model 3000 concentrator 30a (FIG. 2) and the Level 0 Model 3000 concentrator 28. For the Model 3000 concentrator linkage bar 42, the upper tag "2-1" indicates the slot number in which the module is located in the concentrator and the port number on that module. In other words, concentrator 28 (FIG. 2) is connected to concentrator 30a by way of port number 1 of a host module which is located in slot 2 of concentrator 28. The lower tag "2" of linkage bar 42 indicates the slot number of the Model 3000 module which provides the connection. In the event the module is a network management module (NMM) there is only one port, therefore only the slot number of the NMM is depicted. If the module was a host module, the slot and port numbers would both be depicted.

Linkage indicator 44 shows the manner in which a Model 1000 concentrator 30d is connected to concentrator 28. Model 1000 concentrators are interconnected by way of the concentrator backplane, abbreviated "BkP1" and by way of an up-port, abbreviated "UpPt". Accordingly, indicator 44 shows that concentrator 30d (FIG. 2) is connected to concentrator 28 by way of a cable connected between the up-port of concentrator 30d and port 4 of a module located in slot 2 of concentrator 28.

Only one concentrator icon at a time can occupy the Level 0 position of the display. In the typical "star" network topology, the network branches out from one central unit in an inverted tree hierarchy. The upper level usually displays a concentrator icon. However, the topology may have two or more concentrators linked in parallel at the top level of the network. In that case, there will be no concentrator icon in the Level 0 position.

FIG. 4 shows a network topology with seven concentrators 46 connected together at the top level in parallel. The common connection may be, for example, a coaxial cable 48 which forms a "backbone" of the network. In this case, no single concentrator occupies the Level 0 position of the display, as can be seen in the display 50 of FIG. 5. Display 50 reflects this topology by leaving Level 0 empty and places the concentrators linked in parallel in Level 1. Note that the linkage bars carry a top tag with the description "??-??" to reflect the fact that there are no concentrators located above the Level 1 concentrators.

One of the network concentrators is connected to the personal computer which functions as the Network Management Control Console NMCC. As shown in FIGS. 3 and 5, the concentrator which is connected to the NMCC is designated on the display screen with a small icon 51 which resembles a personal computer.

As previously noted, the Network Management Control Console (NMCC) provides a user interface for monitoring and controlling network operations. The interface is a menu-driven display running in a Microsoft Windows environment.

Menu selections are made using a selective technique which is standard to Microsoft Windows pull-down menus. First, the mouse cursor 38 is placed over the name of the desired selection on the menu bar. As can be seen in FIGS. 3 and 5, the menu bar 52 is located at the top of the display and includes selections or functions "FAULT", CONFIGURATION", "PERFORMANCE", "SECURITY", AND "LOG".

The mouse cursor 38 is positioned over the desired selection or function on the menu bar 52 and the primary mouse button is actuated. This action causes a submenu to be displayed. For example, if the "FAULT" function is selected, the submenu 53 shown in FIG. 6 is displayed immediately below the main menu selection. As can be seen, there are seven subfunctions or selections in the "FAULT" submenu. A particular subfunction is selected by dragging the mouse with the primary button still actuated. This action caused sequential subfunctions in submenu 53 to be highlighted. When the desired subfunction is highlighted, the mouse button is released thereby selecting the subfunction. A check mark (not depicted) will appear in the display next to the selected subfunction and will remain there until another function/subfunction is chosen.

The next step is to select a target object for the previously-selected function or subfunction. This is accomplished by positioning the mouse cursor over the target object on the screen. For example, if it is desired to monitor message traffic for a particular concentrator in the network, the DIAGNOSTIC subfunction depicted in FIG. 6 is selected. Next, the mouse cursor is positioned over the target object, such as the concentrator icon 34b in FIG. 3. In particular, the cursor is positioned within the identifier button 43 of icon 34c which contains the concentrator identifier "000081001001". The primary mouse button is then actuated thereby raising a pop-up window to appear or a portion of the display depicting an detailed view of the front panel of the selected concentrator.

FIG. 7 is an exemplary pop-up detailed view window 56 which is displayed when a concentrator is selected. Window 56 occupies a relatively small portion of the display screen, and the position of the window on the display can be changed as desired. The image which appears in window 56 represents the physical appearance of the front panel of the actual concentrator represented by icon 43.

The concentrator image 56 shows that the concentrator includes thirteen plug-in modules the front panels of which are represented by image sections 60a–60m. The modules depicted are exemplary only and it is possible to interchange modules and delete modules as required by the local area network. Each concentrator must include at least one Network Management Module NMM. If one or more modules are deleted, one or more empty concentrator slots will be depicted.

Concentrator image section 60a depicts the front panel of a primary Network Management Module NMM of the concentrator which is shown to be located in the left most position in the actual concentrator. This position is referred to as slot 1 of the concentrator. Image section 60b depicts the front panel of another type of Network Management Module NMM which functions as a backup in the event the primary NMM fails and is located in slot 2. Image sections 60c–60l depict internetworking and host module front panels located is slots 3 through 12, respectively. Finally, image section 60m depicts the front panel of the power supply for the concentrator.

FIG. 8A is an enlarged view of the Network Management Module image section 60a. The image includes a depiction of the front panel mounting screws 62a. Also depicted is the inserter/extractor bar 62b and the model designation "3314M-ST" at location 62c. The model designation represents the Model 3314M-ST Network Management Module. The model designation indicates that the NMM and hence the concentrator in which the NMM is installed is a Model 3000 rather than a Model 1000

Image section 60a also depicts three light emitting diodes (LEDs) labeled "STA", "PAR" and "NMC" at location 62d. LED "STA" represents a green LED which is illuminated when the associated module is functioning properly. Should the module lose power or experience another type of monitored function failure, the LED will be turned off. The image of the "STA" will be a rectangle filled with green to indicate that the actual LED is illuminated and will be filled with black when the LED is off.

The LED labeled "PAR" is yellow and is illuminated (shown in yellow) when the NMM has been disconnected or partitioned from the concentrator backplane. If the module is partitioned, the backup NMM depicted in image section 60b will function as the primary NMM. In the event there is no backup NMM, a partition of the NMM will cause the entire concentrator to be removed from the network.

Image section 60a further depicts a pair of fiber optic connectors at location 62e which are standard ST-type bayonet connectors. The top connector is for receiving data and the bottom connector is for transmitting data. The two connectors function together as a port for interconnecting concentrators. The concentrators can also be interconnected by way of host module ports if the concentrator is Model 3000 type concentrator.

Two LEDs are depicted at location 62f, with a yellow LED labeled "P" being illuminated when the port has been partitioned or disconnected. The LED labeled "L" is a green link status indicator which is illuminated when the receiving terminal of the port is connected to a transmitting device in another module. The LED "L" will not be illuminated (will be shown in black) if the transmit and receive optical cables are reversed.

Section 62g includes a depiction of seven LEDs, two of which are labeled "ONL" and "P/S" green. The LED labeled "P/S" and indicates whether the NMM is acting as the primary or secondary NMM. The "P/S" LED is green and is illuminated when the NMM is the in the primary mode. The LED labeled "ONL" is green and indicates when the NMM is on line. The "ONL" LED image flashes when the NMM has not received software downloaded from the CCA and is illuminated steadily when the software download has succeeded. The top three LEDs relate to network traffic. In the actual module, the top LED, which is yellow, is illuminated for 250 ms when a collision is detected in the concentrator. The second from top LED, which is green, is illuminated while data are present in the concentrator. The third from top LED is green and is illuminated for 250 ms after each data transmission. The fourth from the top LED is a green microprocessor fault indicator which shows the status of the microprocessor in the NMM.

A nine pin male type DB-9 connector is depicted at location 62g of section 60a which functions as a service port. Location 62j includes a circular element which represent a microprocessor reset button on the actual module. Location 62k includes a rectangular element which represents a switch which allows termination of the connector at image section 62i. Finally, locations 62h and 62i represent type RJ45 female connectors for connection to unshield twisted pair (UTP) cable. The connector at location 62h is for a serial port for out-of-band communication between concentrators (NMMs) and the connector at location 62i is for connection to an internal modem for out-of-band communication. Out-of-bond communication is communication separate from the primary network communication paths and may be, for example, a telephone line.

FIG. 8B is an enlarged view of image section 60b of FIG. 7 which depicts the backup or secondary Network Management Module. The image is substantially identical to image section 60a with a few minor exceptions. At location 64a, the designation "3314-ST" appears which represents the Model 3314-ST Network Management Module. The Model 3314-ST includes an additional connector, the image of which is depicted at area 64b. The connector is a D13-25 type interconnect and functions as a standard RS-232 serial port for out-of-band connection to a telephone network. The telephone network can be used to communicate out-of-bond with the NMM in lieu of the standard network (CSMACD) communication path.

The image section 60c of FIG. 8C depicts an internetworking module. The designation "3323" of area 66a of the image indicates that the module is Model 3323. The module is a local bridge which functions to interconnect two local area networks of the same type. The local bridge will only pass traffic that originates in one segment of the network and is intended for the other network segment.

Front panel image 60c includes a region 66c which depicts a fifteen pin D type female connector for connecting the module to an Attachment Unit Interface (AUI) device. An AUI is a standard logical, electrical and mechanical interface for connecting Data Terminal Equipment (DTE) such as a personal computer, server and the like to the network. Region 66d includes ten LEDs which provide static and dynamic status conditions of the internetworking module.

The image section 60f of the FIG. 7 image is shown enlarged in FIG. 8D depicting the front panel of a host module. The upper region includes the designation "3304-ST" which indicates that the model is a Model 3304-ST host module. The image depicts a total of six ports for connection to up to six DTEs. As shown in region 68b, each port is represented by the image of two ST-type bayonet optical fiber connectors, with the top connector for receiving data and the bottom connector for transmitting data. The designation "P" and "L" and the image of two LEDs in region 68c correspond to the image and designation in regions 62e and 62f of the image section 60a of FIG. 8A.

FIG. 8E is an enlargement of the image section 60d of FIG. 7. The designation "3302" at region 70a of the image indicates that the depicted module is Model 3302 host module. A total of six ports are depicted for connection to up to six DTEs. As shown in section 70c, each port is represented by an image of a nine pin type DB-9 connector for connecting to a shield twisted pair (STP) cable.

Region 70b includes the standard LEDs "STA", "PAR" and "NMI". In addition, the region includes six pairs of LEDs, with one pair associated with one of the six ports. The LEDs labeled "P" are a yellow LED which indicate, when illuminated (shown in yellow), that the associated port has been partitioned or disconnected from the network. The LEDs labeled "L" is a green LED showing the link status. If the port is connected to a compatible transceiver or network interface card, the LED is illuminated (shown in green). If the port is not connected, the LED turns off (shown in black) and an autopartition takes place, automatically partitioning the port so that the associate LED "P" will turn on.

An enlargement of image section 72b is shown in FIG. 8F. The designation "3305" at region 72a of the image section indicates that the module is a Model 3305 host module. The host module has twelve ports depicted by twelve images of a connector. The image of the connector associated with the first port is at region 72c. The image is of a standard RJ-45 modular female connector for connection to unshield twisted pair (UTP). There are twelve pairs of LEDs depicted in region 72b, with one pair of LEDs associated with one of the twelve ports. The function of the twelve LED pairs labeled "P" and "L" is the same as the LED pairs bearing a similar label in region 70b of FIG. 8E.

The image 60m of the front panel of the concentrator power supply (FIG. 7) also includes an image of a status LED which is illuminated (shown in green) when the power supply is producing the specified voltages.

There are various specific objects in the concentrator image which a user can select using the mouse pointer. In doing so, the user can select the object of the function or subfunction, as depicted in FIG. 6, which was previously selected.

There are three category of concentrator objects which can be selected, including the overall concentrator, a particular module in the concentrator, or a particular port of a particular module.

The overall concentrator object is selected by placing the mouse cursor 38 over the image 60a of the primary network management module NMM of the concentrator of the detailed view concentrator image 56 of FIG. 7 and actuating the primary mouse button. Assuming that the subfunction DIAGNOSTIC had been previously selected, diagnostic information regarding the entire concentrator will be displayed. This includes, for example, specific data packet errors, such as alignment errors, in the concentrator. Data packets are a form of data structure for Ethernet communication and alignment errors are errors which occur when a received frame does not contain an integer number of bytes. A frame is a packaging structure for Ethernet data and control information.

If a particular module is to be selected, the mouse cursor 38 is positioned over the top portion of the desired module. Note that selecting the primary network management module is equivalent to selecting the entire concentrator, as previously noted. When this occurs a small window formed from dashed lines automatically appears thereby indicating to the user that the cursor has been positioned in an active image location. As can be seen in the upper portion of image 60d of FIG. 7, a window 74 will enclose the image of the model number and the status LEDs for the module if the mouse cursor is positioned in that image area and the secondary button actuated. If the primary mouse button is then actuated, the module is selected as an object. Thus, if the subfunction is DIAGNOSTIC, diagnostic information regarding the module represented by image section 60d will be displayed. Such information may include, for example, packet alignment errors received by all ports on the module.

If a particular port is desired, the mouse cursor is positioned over the image of the port. A window will then appear, such as window 75 (FIG. 7) associated with port number 6 of the module depicted by image section 60f. As another example, if port number 1 of the module depicted by image section 60l is selected, a window 76 will appear as shown. If the user then actuates the primary mouse button, diagnostic information regarding the selected port will be displayed. Such information includes, for example, packet alignment errors received by the port.

FIG. 9 shows an image 78 of a different style of concentrator, referred to as the Model 3030, which can accommodate up to four plug-in modules. Again, image 78 depicts the physical appearance of the front panel of the actual concentrator. Image section 80c shows the power supply section of the concentrator, with two status LEDs with the associated designation "Power" and "FAN" being depicted. The "Power" LED is shown green when the D.C. power is at the proper voltages. The "Fan" LED is shown yellow in the event the fan speed falls below a minimum rate of rotation.

The four exemplary plug-in modules are mounted horizontally in the Model 3030 concentrator, as can be seen in FIG. 9. Image section 80b represents a Model 3314M-ST Network Management Module which is the same module depicted in image section 60a in FIG. 7. Image section 80c, 80d and 80e of FIG. 9 depict modules Models 3314-ST, 3304-ST and 3305 which are the same modules depicted in image sections 60b, 60f and 60g, respectively, of FIG. 7. The user can select the entire concentrator, a particular module (slot) and a particular port using a mouse in the same manner previously described in connection with the image shown in FIG. 7.

A functional block diagram of a typical concentrator 28 is shown in FIG. 10. As previously described, each concentrator includes a chassis which receives several plug-in modules which are inserted in adjacent concentrator slots. Each module is provided with a rear connector which engages a common concentrator backplane 82 which is located along the entire rear portion of the concentrator. Backplane 82 includes a set of electrical connections which form a CSMA/CD bus 84. The backplane further includes several electrical connections which form a control bus 86. The CSMA/CD bus is similar to an Ethernet network coaxial cable which carries conventional 10 Megabit Manchester encoded digital signals of the type distributed throughout the entire network. The control bus 86 of the concentrator backplane enables the concentrator Network Monitor Module 88 to communicate with the other modules in the concentrator, including host modules 90a through 90b (only two host modules are shown)

The host modules 90a-90b each has one or more ports which can be connected to Data Terminal Equipment DTE 91 as shown in FIG. 10. When a particular DTE transmits data over the network, the CSMA/CD signal is received by a port and is transferred by the host module associated with the port to the CSMA/CD bus 84 of backplane 82. NMM 88 receives the CSMA/CD signal by way of data steering logic (DSL) represented by block 90. The logic is capable of receiving data from CSMA/CD bus 84 and transmitting data onto the bus. The other modules in the concentrator do not receive the CSMA/CD data at this time.

The received CSMA/CD data are transferred to a repeater and retiming unit (RRU) represented by block 92. As is well known the RRU retransmits the CSMA/CD data. In doing so it is necessary to retime the data to account for the distortion inherent in the transmission link.

The RRU 92 transfers the retimed CSMA/CD data back to the data steering logic DSL 90 which places the CSMA/CD signal back on bus 84. The other modules in the concentrator are configured to receive the repeated CSMA/CD data. The repeated CSMA/CD data are also transferred to the network by way of media dependent adapter MDA represented by block 94. The output of the MDA on line 102 will connect the CSMA/CD signal to the appropriate transmission media, such as fiber optic cable, unshield twisted pair (UTP) or shield twisted pair (STP). Line 102 can be connected to another other concentrator of the network so that the entire network will receive the CSMA/CD data. Other concentrators can also be connected to the subject concentrator by way of the host module ports.

Each module in concentrator is connected to the control bus 86 of the backplane by way of a Network Module Interface (NMI), including NMI 106 in the Network Management Module (NMM) 88 and NMIs 107 in the various host modules 90a-90b.

The NMM 88, which includes a central processor unit and associated memory, as will be described, monitors and controls the other modules in the concentrator by way of control bus 86. Typically, the other modules in the concentrator are not required to contain any form of processor, with the "intelligence" of the concentrator management function residing almost exclusively in the NMM 88.

A Network Management Control Console NMCC 93 is connected to port 2 of host module 90b. As previously explained, the NMCC is typically a personal computer having a graphic user interface 93b and a control console adapter CCA 93c in the form of an expansion card located in the computer.

The NMM can control the various modules either in response to commands received by the NMM over the network which originate from the Network Management Control Console NMCC 93. For example, the user at the NMCC can command the NMM in a particular concentrator to reset the entire concentrator or reset a particular module or port. The RESET subfunction depicted in FIG. 6 is first selected by the user. Next, the expanded view image of the desired concentrator is displayed as depicted in FIGS. 7 or FIG. 9. The user can then select the desired object including the entire concentrator, a particular module or a particular port using the mouse. The previously-described LEDs on the concentrator modules will indicate in some predetermined manner whether the reset command was successful.

The user can also use the NMCC to initiate a loopback test wherein a test packet is transmitted over the network to a selected concentrator and the concentrator is instructed to transmit the test packet back to the NMCC. The user first selects the "LOOP BACK" subfunction shown in FIG. 6. Next, the user selects the concentrator to be tested. The NMCC then verifies communication between itself and the selected concentrator by transmitting a data package to the concentrator which is echoed back by the concentrator to the NMCC.

The NMCC 88 can also monitor the status of a particular concentrator, module or port. The user first selects the STATUS subfunction as depicted in FIG. 6. Next, the user selects the object using the expanded view of the concentrator as shown, for example, in FIG. 7 or 9. A status report regarding the selected object is then displayed in a pop-up window. If the selected object is a concentrator, the report will indicate, among other things, whether the retiming unit, such as RRU 92 in FIG. 10, is functioning properly. If the selected object is a module, the status report will indicate whether the module power supply is functioning properly, whether the module has been enabled or disabled, and whether the Network Monitor Interface NMI, such as NMI 107 in FIG. 10, is functioning properly. If a port has been selected, the status report will indicate whether the port is active or has been partitioned. Other information can be included in the status reports, if desired.

A functional block diagram of the Network Management Interface NMI 107 for interfacing the host modules to the control bus 86 of the concentrator backplane 82 is shown in FIG. 11. The NMI 107 includes a state machine for transferring network management interface data between the host module and the control bus 86. Typically, the NMM issues a command by way of the NMM Network Management Interface NMI 106 to one of the host modules over the control bus and the recipient host module transmits a response back to the NMM over the control bus.

Block 92 represent a sequential state machine which transfers eight bits of interface data between the host module and the control bus. State machine 92 is preferably a gate array although other types of circuitry could be used. A bidirection buffer 94 is connected to eight lines of the control 86 bus through eight pins (not depicted) on the rear electrical connector of the host module. The eight bidirection lines 96 each carry one of the eight bits of Network Management Interface Data (NMIDAT).

Lines 96 are connected to the input/output of the bidirectional buffer 94. Another set of buffer input/output lines are connected to the state machine by way of eight bidirection data lines 98. Data are transferred through buffer 94 either from the control bus 86 to the state machine or from the state machine to the control bus, depending on the status of the direction line 100 controlled by the state machine.

Various timing and control signals are produced by the Network Management Module, NMM, on three lines, collectively designated by numeral 102. Timing and control signals DENL, RD/WRL and DAT/CMDL are used for transferring the interface data on lines 96 between the NMM and the host modules over the control bus 80.

Each slot of the concentrator, which is capable of receiving a plug in module, is assigned a unique slot identification number. The four bits of slot identification (Slot ID) on lines 104 are produced by hard wiring (strapping) selected ones of four connector pins of the slot to either high or low logic levels. The four slot identification bits are transferred to the state machine 92 on four lines designated by the numeral 104. The state machine 92 uses the slot identification bits to decode commands from the NMM transmitted over the control bus which is directed to the particular module which is inserted in the identified slot.

The four bits of slot identification are also transferred to programmable array logic device (PAL) 106. PAL 106 also receives signals from each of the twelve ports of the modules over twelve separate line designated by the numeral 108. If a particular port is active (receiving data over the network), the appropriate one of the twelve lines will go to a logic high level. If the particular module in the slot has less than twelve parts, not all of the lines will be used. PAL 106 includes circuitry for encoding the signals from the port and producing a four bit port identification code on four lines designated by the numeral 112. The code uniquely identifies a particular port receiving data over the network.

When one of the port activity lines 108 is active, PAL will produce the appropriate port identification on lines 112 and will also transmit the slot identification code IDOUT on four lines 110. As will be described later, this information is received by the NMM and eventually transferred to the Network Management Control Console NMCC and is used to automatically generate the topology of the network.

State machine 92 receives eight bits of module identification code on lines 134 and four bits of module revision code on line 132. The identification code and revision code identify the module model number and revision number. The codes are produced in the module by hard wiring the appropriate lines in the module itself to either a logic low or logic high signal. The model and revision identification codes are transferred to the NMM, when requested by the NMM, over data lines 96. This information is eventually forwarded by the NMM to the Network Management Control Console and is used to produce the expanded view images, such as depicted in FIGS. 7 and 9.

As previously described, the Network Management Control Console NMCC can command the concentrator, modules and ports to provide certain status information. The NMM in the appropriate concentrator receives the commands over the network and issues commands to particular modules over the control bus 86 in response to the NMCC command or in respond to commands originating in the NMM itself.

One command requests the status of a particular module, with the command containing the slot identification number or address of the module. The state machine of the Network Management Interface 107 in the host module receives and decodes the command and provides the requested status information. This information includes the module identification and module revision (module type information) originating on lines 132 and 134. Lines 130 Carry four status bits which can also provided to the NMM. One of the four status bits is the state of the status LED located at the top of the front panel of the majority of the plug in modules, as shown in region 62d of FIG. 8A. The green status LED is illuminated (depicted in green) if the module is powered and if other basic module functions are proper.

The NMM can also issue commands in response to the Network Management Control Console to reset the module as previously described. If the state machine detects a reset command on the control bus 86 directed to the module, the state machine will produce a reset signal on line 128.

A module disable command can be issued by the NMM to disconnect or partition the entire module from the network. As previously described, this command can be issued by the NMM in response to a command originating from the Network Management Control Console. When this command is detected by the state machine on the control bus 86, a disable signal is produced on line 126 and the module is partitioned. As will be described later, the other commands can be used to disable or partition individual ports.

The NMM can also issue a watchdog activity pulse command. When this command is received, a watch dog signal is produced on line 124. The signal is typically used to rest a count-down timer on the module. The NMM is programmed to periodically issue the watchdog command at a sufficient frequency so as to prevent the counter from counting down completely. If the counter does count down completely, this is typically an indication of a fault condition. If this condition is detected, the NMM is reset.

The state machine 92 is also capable of detecting commands which are unique to the particular type or kind of module. For example, a command can be issued which will disable or partition a particular port. Since the number of ports on host modules differ, it is necessary to construct unique port partition commands for different module types. Also, different types of status commands can be transmitted by the NMM requesting status data unique to a particular type of module, such as the status of various LEDs located on the front panel of the module.

Eight bidirectional data lines represented by numeral 114 are connected to the state machine 92 for providing data to support the unique commands. Data are read out of the state machine on lines 114 when the read/write signal RD/WR on line 118 is high. Data can be transferred to the machine if the signal on line 118 is low.

The five lines designated by the numeral 116 are network management function NMFC decodes which are produced in response to various unique commands received by the state machine. The decodes are used to control logic circuits on the module in a predetermined manner, depending upon the type of command and the module type. The decodes are ten bits, with the signal HBEN on line 120 indicating when the five bits on lines 116 are the high or most significant bits. The signal LBEN on line 122 indicates when the five bits on lines 116 are the low or least significant bits.

As previously described, the network topology is displayed at the Network Management Console 93. The topology is produced automatically and is updated automatically in the event the network configuration is altered.

FIG. 12 is a block diagram of one exemplary network depicting the topology of the network. The exemplary network includes a total of eight interconnected concentrators 100, 102, 104, 106, 108, 110, 112 and 114. Each concentrator is provided with a Network Management Module. The network is monitored and controlled by a Network Management Control Console NMCC (not depicted) which can be a part of a DTE associated with any one of the network concentrators.

The depicted network includes a mix of two types of concentrators including both Models 1000 and 3000. As previously described, the Model 1000 is less flexible than the Model 3000 type. The Model 1000 includes an NMM which can distinguish only two ports. There is an Up Port which refers to the connection of the NMM to the Media Dependent Adapter (MDA). There is the Down Port which collectively refers to all of the ports on the host modules of the concentrator. The Model 1000 NMM cannot distinguish between different host module ports.

The Model 3000 concentrator includes the capability of distinguishing between the individual host module ports and can identify the particular port number and slot number on which a message is received on the network. The operation of this feature was previously described in connection with the Network Management Interface (NMI) of FIG. 11. The Model 1000 NMMs can be connected Up Port to Up Port, but Down Port to Down Port connections are not allowed. The Model 3000 NMMs are more flexible and can be connected by way of any of the ports of the concentrator.

The Control Console Adaptor (CCA) of the Network Management Control Console (NMCC) is responsible for building and maintaining the topology of the network. The CCA interacts with all of the Network Management Modules over the network through a sequence of protocol frames referred to as Protocol Data Units (PDUs).

The CCA also exchanges messages with the User Interface (UI) 93c (FIG. 10) of the personal computer of the Network Management Control Console. The User Interface (UI) includes the Windows graphic user interface. The CCA communicates with the User Interface by way of a Memory Resident Driver (MRI) on the personal computer and converts the PDU formats to and from the User Interface.

Each of the Network Management Modules (NMMs) includes a processor and associated memory, as will be described. The NMM processor executes code in a local RAM which is downloaded from the CCA of the NMCC to each of the NMMs.

The sequence for producing the initial network topology will now be described. Initially, the Control Console Adapter (CCA) transmits a Protocol Data Unit (PDU) over the network to each of the network NMMs. The PDU, called Loadserver Ready, is transmitted every five seconds and indicates to the NMMs that the CCA is ready to download code to each of the NMMs.

After power up, all of the NMMs listen for the Loadserver Ready message. Once the message is received, the NMMs request the CCA to download their respective code.

Following download, all of the NMMs transmit what is referred to as a Hello PDU or message over the network. The Hello message is transmitted with a predefined group of multicast addresses. Each NMM in the network should receive the Hello message which contains the address of the NMM which originated the message. The Hello messages contains information regarding the model and revision number of the originating NMM as described in connection with FIG. 11 (lines 134, 132). This latter information Will be used to distinguish between Model 1000 and 3000 NMMs (and concentrators).

Each concentrator should receive a Hello message from each of the other concentrators in the network. A Model 3000 has the capability of monitoring the particular port over which the Hello message is received, as previously described. Model 1000 concentrators can only distinguish between Up Port and Down Port messages.

Each NMM maintains an internal list or table of the port-slot and NMM address for each of the received Hello messages. If the NMM is a Model 1000 the "port-slot" will be either Up Port or Down Port. For example, for the configuration shown in FIG. 12, concentrator 106 having NMM address "05", has direct connection to the three other concentrators. Concentrator 112, having address 06, is connected to concentrator 106 at slot 3, port 2 (3-2). Concentrator 114, having address 08, is connected to slot 6, port 1 (6-1) of concentrator 106. Finally, concentrator 100, having address 03, is connected to slot 4, port 2 (4-2) of concentrator 106.

Once concentrator 106 has received a Hello message originating from each concentrators in the network, it will construct an NMM list. The list will have a total of seven entries since there are seven other concentrators in the network. The NMM list will reflect that a Hello message from concentrator address 06 was received over slot 3, port 2 (3-2), and that another Hello message originating from concentrator address 08 was received over slot 6, port 1 (6-1). Finally, the list should further reflect that Hello messages originating from the remaining five concentrators were received on slot 4, port 2 (4-2) of concentrator 106.

FIG. 13 is on NMM List table containing the NMM list for all of the concentrators of the FIG. 12 network. The left column, the "Reporting Concentrator Address" column, contains the address of each of the reporting concentrators. The middle column, the "Slot-Port" column, contains the slot and port over which Hello messages were received. The right column, the "Concentrators Heard" column, contains the concentrator address which indicates the address of the concentrator which originated the Hello message.

The NMM entry in the NMM List table for concentrator 106, which has address 05, indicates that Hello messages originating from the remaining seven concentrators were received over three separate ports (3-2, 6-1 and 4-2), as previously described. This information is collected and stored in concentrator 106, to be eventually forwarded to the CCA 93c. Similarly, concentrator 104, having address 01 received all seven messages over a single port, namely slot-port 2-1. This information is also collected and stored in concentrator 104 to be forwarded to the CCA. The other concentrators collect and store similar information as can be seen in the NMM List table of FIG. 13.

Each concentrator has only limited information concerning the topology of the network. For example, concentrator 106 (address 05), can ascertain that it received Hello messages from five concentrators over slot-port 4-2. However, the concentrator is unable to ascertain the actual path taken over the network by the Hello messages. For example, concentrator address 05 cannot ascertain that the Hello message originating from concentrator 104 (address 01) was forwarded by concentrator 100 (address 03) instead of taking some other path, such as a direct path.

Although the NMM list of a particular concentrator does not contain sufficient information to create the network topology, the total information in the NMM tables created by each of the concentrators does contain sufficient information. As will be described, this information is collected from the NMMs by the CCA in a format such as the FIG. 13 NMM List table to create the overall network topology.

The CCA monitors the various Hello messages transmitted by each NMM in the network. The CCA creates a table, such as the FIG. 16 Ancestor Table, which initially only includes the NMM addresses of all of the concentrators in the Network. The NMM addresses are used to allocate memory for creating the Ancestor Table. The CCA also determines which NMM and associated concentrator will become the root of the topology tree. The NMM List table will also contain information (not depicted) regarding the particular type of NMM so that the CCA can distinguish between Model 1000 and 3000 NMMs.

FIG. 14 is a block diagram of the process after the Hello PDUs have been received by the CCA which contain the addresses of the reporting concentrators. The diagram illustrates the manner in which the CCA obtains information from the concentrators to complete the Link Table of FIG. 13. Element 118 of FIG. 14 represents the block request transmit process where the CCA transmits a separate message N1-Nn, represented by lines 122, to each of the concentrators in the network 120 for which a Hello PDU was received. The messages request that the concentrators provide the CCA with the NMM list associated with the concentrator.

Each of the messages of the block request is referred to as a Get NMM List message and the messages are transmitted sequentially over the network, preferably back-to-back. The concentrators in the network 120 respond to the Get NMM List messages by transmitting back to the CCA an NMM List PDU, represented by lines 24. The NMM List PDU contains NMM List of the reporting concentrator. As previously described, the list contains the addresses of the concentrator received by the reporting concentrators and the slot-port over which the messages are received.

The NMM List PDUs may be received and processed by the CCA, as represented by block 126 in any order. It is possible that some of the concentrators will not respond to the Get NMM List PDU for some reason. In that case the returned messages Nr will be less than the transmitted messages Nl-Nn. As indicated in block 126, the CCA monitors the number of response by incrementing an NMM List received counter.

The CCA will monitor the received NMM Lists. If the CCA fails to receive an NMM List from one or more concentrators, the CCA will wait a predetermined period of time. Once the period of time has expired, as represented by element 128, the CCA will issue a further block request comprising Get NMM List PDUs separately directed to the concentrators which have not responded or which have been dropped in the CCA or dropped somewhere in the network. This is a connection list protocol so that delivery of a message is not assured. The message could have been involved in a collision, for example. This process is repeated a maximum of five times, as indicated by element 130. If the maximum number of retries is exceeded, an error message is issued as shown by block 132.

A determination is then made as to, as indicated by element 136, whether the CCA has received a NMM list from all of the concentrators in the network which are to be included in the topology. The process carried out by the CCA utilizing the NMM List data is represented by the flow diagram of FIG. 15. The results of the process are shown in the Ancestor Table of FIG. 16, as will be explained.

Each NMM sends its link information to the CCA in the format given in FIG. 13. The link data is also known as the NMM List. The link data are arranged by slot-/port group. For example, in FIG. 13, the NMM with address 05 sends three groups of link data, one group associated with slot-port 3-2, another associated with slot-port 6-1, and the last associated with slot-port 4-2. The CCA processes each list using the following method. The CCA searches through each slot-port group for the presence of the root NMM, which had been previously selected. If the Root NMM exists in that group, the slot-port number is entered in the "Own-Slot-Port" field of the Ancestor Table, such as the NMM at concentrator address 05 in FIG. 16. However, if the Root NMM is not present in the slot-port group, the CCA accesses the "Ancestor" field of each group member in FIG. 16 and enters the address and slot-port numbers of the reporting NMM. That is, the reporting NMM becomes one of the ancestors for NMMs existing in slot-port groups not containing the Root NMM.

The CCA processes these lists on-the-fly, and discards the data. There is no requirement to save individual NMM link data, which can exceed 1200 bytes for a large network.

Block 138 of FIG. 14 is executed after all NMM lists are received and processed by the CCA. This block checks the Ancestor Table of FIG. 16, and resolves immediate parent-child relationships of each NMM. The parent of an NMM is the ancestor of the NMM which is one level lower than itself. Note that the Root NMM does not have any ancestors.

As previously described, the topology depicted in the Network Management Control Console NMCC display includes various concentrators connected in an inverse tree hierarchy. The highest level of the hierarchy, Level 0, contains a single root concentrator. Level 1 contains the concentrator in the next from highest level and so forth.

It should be noted that there is not necessarily a unique topology display for a particular network configuration. For example, concentrator 100 shown in FIG. 12 is shown at the top of the network hierarchy but the topology could be drawn with another concentrator as the root concentrator.

The CCA selects one of the concentrators to be the root concentrator before requesting the NMM List for the concentrator.

If the network is comprised exclusively of Model 1000 NMMs, the CCA selects the concentrator with the largest number of Down Port links as the root concentrator. This will also be the one concentrator with no Up Port links, with one exception. It is possible that more than one concentrator having a Model 1000 is connected by way of the Up Port. For example, in FIG. 17, there are three concentrators, 116a, 116b and 116c, connected by way of the Up Port link. In that event none of the concentrators will be selected as the root. A dummy concentrator will be assigned the root position (a virtual root) and the actual concentrators 116 will be assigned to the Level 1 and lower hierarchy levels.

If the network includes only concentrators having Model 3000 NMMs, any of the concentrators can be selected as the root. However, the CCA selects the concentrator with the maximum number of links.

Assuming that the network includes concentrators having both Model 1000 and 3000 NMMs, a concentrator having a Model 1000 NMM, with no other concentrator having a Model 1000 NMM linked to the Up Port, will be selected as the root. Although any concentrator having a Model 3000 NMM located on the Up Port side of the highest level Model 1000 NMM could also be selected, this information is not available to the CCA from the network.

In the present example, concentrator 102 having a concentrator address 02 is selected as the root of the network because it is the only concentrator having a Model 1000 NMM at this early stage of the processing.

Returning to the FIG. 15 flow chart, once the root concentrator is selected, one block of entries is taken from the NMM List of FIG. 13 as indicated by element 146 of the chart. An entry is defined herein as the address of a particular concentrator heard over a particular slot-port of the reporting concentrator. A block of concentrator entry means all of the concentrator addresses heard over a particular slot-port. For example, in the NMM List of FIG. 13, reporting concentrator address 03 has three blocks of entries. The first block includes the address of the concentrators heard over slot-port 2-1, including address 02, 07 and 04.

Assume that the first block of entry for concentrator 03 has been obtained. The next step is to determine whether the block contains the address of the previously-selected root concentrator, as indicated by element 148.

Each reporting concentrator will receive message from all concentrators, including the root concentrator. The block of entries for slot-port 2-1 of concentrator address 03 includes root concentrator address 02. As indicated by element 150 in the flow chart, the slot-port over which the reporting concentrator receives messages from the root concentrator is added to the Root column of the FIG. 16 Ancestor Table. Thus, entry "2-1" is added to the Root column for reporting concentrator address 03.

Once the slot-port has been added, a determination is made as to whether all blocks have been processed or updated, as shown by element 160. In the present case, only a single block has been processed, therefore the next block of entry from the Link Table of FIG. 13 is processed, as represented by blocks 162 146.

The next block includes one entry, address 01, which indicates that the reporting concentrator address 03 received messages from concentrator address 01 over slot-port 3-2. This information indicates that reporting concentrator address 03 must be used by concentrator address to communicate with the root concentrator. In other words, reporting concentrator address 03 is an "ancestor" of concentrator address 01. If concentrator 01 is connected directly to concentrator 03, concentrator addresses 03 and 01 have a "parent"—"child" relationship, respectively. At this point in the processing, there is only enough information to indicate that an ancestor relationship exists between the two concentrators.

As shown by block 152, the address of the entry is obtained, address 01, so that the appropriate location in the Ancestor Table of FIG. 16 is located. Next, the address of the reporting concentrator, 03, is entered in the Ancestor column associated with concentrator 01, thereby indicating that concentrator address 03 is an ancestor of concentrator address 01. The slot-port showing the connection to the ancestor concentrator, 3-2, is added to the slot-port column of the Table.

The Level column in the Ancestor Table indicates the level of the associated concentrator in the network hierarchy. The level is initially set to zero for all of the concentrators. Only the root concentrator will remain at Level 0.

Since concentrator address 01 is below concentrator 03 in the hierarchy of the network, it is known that the concentrator address 01 cannot be at Level 0. The value of the level entry for concentrator address 01 is increased by one, as indicated by block 156. Eventually, the level for address 01 will be increased to two, as shown in the Table.

Next, a determination is made as to whether all the entries for the block have been processed or updated as shown by element 158. In the present example, there was only one entry in the second block. Accordingly, the next block of entry for reporting concentrator address 03 is obtained. This block contains three entries, including concentrator addresses 05, 06 and 08 which transmitted messages received by reporting concentrator 03 over slot-port 4-1.

The entry does not contain the root concentrator at address 02 (element 148). Accordingly, the address for the first entry of the block, address 05, is read so that the appropriate location in the Topology Table is found. Next, the reporting address 03 is entered in the Ancestor column of the Table together with the slot-port 4-1. The level number for address 05 is increased by one (block 156) and a determination is made as to whether all entries for the block have been processed (element 158).

Since the block contains the two additional entries, addresses 06 and 08, these entries are then processed. Concentrator address 03 is entered as an ancestor to concentrator 06 together with the slot-port 4-1 (block 154) and the level is increased by one. Concentrator address 03 is then entered as an ancestor for concentrator address 08 together with slot-port 4-1. Again, the level number for address 08 is increased by one.

Once all of the entries for the block have been processed (element 160), the next block of entries is obtained (block 146). There is one block of entries associated with reporting concentrator 04 in the NMM List. Since the block contains the root concentrator address 02, the slot-port 3-1 is entered in the Root column of the Topology Table (block 150). All blocks of entry have been processed (element 160), therefore, the next block is obtained.

The process is repeated for the three blocks of entry for reporting concentrator addresses 01, 08 and 06. In each case, the block contains the root concentrator so the slot-port over which the root concentrator is heard is added to the "Own Slot-Port" column of the Ancestor Table. Thus, slot-port 2-1, 3-1, and 2-6 are inserted in the Root column for reporting concentrators 01, 08 and 06, respectively.

Reporting concentrator address 05 in the NMM List includes three blocks on entry. The process is repeated with concentrator address 05 being inserted in the Ancestor Table as an ancestor to concentrator 06 and 08 together with port-slot 3-2 and 6-1, respectively (block 154). The level numbers for the two addresses are also increased by one (block 156).

The next entry for reporting concentrator 05 indicates that the root concentrator address 02 is heard by concentrator address 05 over port-slot 4-2. That entry is made (block 150) in the Root column of the Ancestor Table at concentrator address 05.

The next block of entry is for root concentrator address 02. By definition, all concentrators are descendants of the root concentrator. Accordingly, the root concentrator address 02 will be inserted as an ancestor for each of the seven other concentrators, together with the associating slotports. Since the root concentrator is a Model 1000 concentrator, the slot-port will be either Down or Up. In addition, the level for each of the concentrators, other than the root concentrator, will be increased by one.

The last block of entry is for concentrator address 07. The block contains the root concentrator, so the slot-port, 4-7, is entered (block 150) in the Root column of the Topology Table. As indicated by element 160, all blocks of the Link Table will have been processed or updated. Accordingly, the information in the Link Table is no longer needed and the Table is discarded, as represented by block 164.

Information in the FIG. 16 Ancestor Table is then used to create a display of the actual network topology. The Level column of the Table will have been increased each time an ancestor is added so that the final value accurately reflects the level of the concentrator in the network. It is then possible to distinguish parent concentrators from other ancestor concentrators. For example, concentrator address 01 has two ancestor, and is, therefore, at level 2. The ancestors include addresses 03 and 02. Concentrator address 03 is at Level 1 and address 02, the root concentrator, is at Level 0. Accordingly, concentrator 03 is the parent concentrator of concentrator address 01.

The information in the Ancestor Table, together with the information regarding the model number of the concentrator, is then forwarded to the User Interface of the Network Management Control Console to create the network topology display. A somewhat simplified display topology image is depicted in FIG. 18 which is generally designated by the numeral 137. The topology image is based upon the exemplary network of FIG. 12. Note that the actual display will show only two levels of concentrators, rather than the three levels depicted.

Level 1 shows the icon for the root concentrator address 02. The icon indicates that there are three levels of concentrators below Level 0 and there are a total of seven concentrators below.

The Level 1 icons depict the concentrator addresses 03, 04 and 07. The linkage symbol for address 03 indicates that the concentrator is connected from port 1, slot 2 of the Model 3000 concentrator to the Backplane (BK PL) of the Model 1000 root concentrator at address 02. The up link for address 03 is from a particular port, port 1, of the module located in slot 2 of the concentrator. The up link could also have been made from the Network Management Module NMM of the concentrator. Since a NMM has only a single port, only the slot number of the NMM in the concentrator would be depicted in the linkage symbol.

The CCA will automatically update the Network Topology Table of FIG. 16 should the configuration of the network changes. For example, if a concentrator is added by connecting it to slot-port 4-8 of concentrator address 07 of FIG. 12, the presence of the new concentrator would be detected and the topology display updated.

As previously described, the CCA monitors the Hello PDUs from every NMM in the network. If three consecutive Hello PDUs are missed from a particular NMM, the NMM is treated as missing and a warning message is sent to the User Interface for display., Similarly, if three consecutive Hello PDUs are missed from a particular NMM of a concentrator, the NMM is aged out of the NMM list in the Link Table. The NMM is also issued a Kill NMM PDU by the other NMMs. If the NMM of the concentrator responds, it will transmit what is called a New Hello PDU and will rejoin the network as a new concentrator. This procedure ensures that the CCA can detect any changes in concentrator connectivity.

An NMM in the network will transmit a Hello PDU in any of the three situations. First, a Hello PDU will be transmitted after the NMM has received down loaded code from the CCA. Second, an NMM will issue a Hello PDU if the NMM fails to receive three consecutive CCA Loadserver Ready PDUs which, as previously noted, indicate to the NMMs that the CCA is ready to download code to the NMM. Finally, an NMM will transmit the Hello PDU after it receives a Kill NMM PDU.

When the CCA detects a New Hello PDU, it commences an update of the network topology. If the number of new concentrators is relatively small, less than ten, the CCA updates each NMM location in the topology tree by using a binary search method. First, the CCA compiles a table of new concentrators. The CCA then requests the root concentrators for its NMM list.

If a new NMM is present in the root NMM list, the NMMs in the next level down are requested to provide the associated NMM list. This process is repeated until the NMM list from the reporting concentrator indicates the presence of only the new NMM over that port.

If more than ten new NMMs have been added to the network, it is more efficient to simply rebuild the topology as previously described.

The Network Management Modules (NMMs) and the Control Console Adapter (CCA) can be implemented in a variety of ways to carry out the previously described functions. Since the particular details regarding the construction of the NMM and the CCA form no part of the present invention, the NMM and the CCA will only be briefly described.

FIG. 19 is a functional block diagram of the Network Management Module (NMM). The NMM includes a microprocessor 166, such as a microprocessor manufactured by NEC having the designation V35. The microprocessor includes a core 168 and service port 170. A serial port 172 is provided for connecting the NMM to a modem for out of band (external to the network) control of the NMM.

The microprocessor is coupled to a multiplexed address output bus 176 and a data bus 178. An address buffer 177 is provided for storing the upper byte of address so that the full address can be used for dynamic random access memory (DRAM) 180, programmable read only memory (PROM) 182 and static random access memory (SRAM) 184.

PROM 182 is a boot memory and DRAM 180 holds the code for the individual NMMs which is downloaded by the CCA to the NMM over the network. SRAM 184 is used to hold frames of the data either received from the network or to be transmitted over the network.

Block 192, collectively representing miscellaneous control circuitry, including SRAM access control, data bus control, memory I/0 decodes, various counters, special functions and various glue logic.

The data and address busses are coupled to a conventional network interface controller (NIC) 188, such as the controller marketed by National Semiconductor under the designation DP8390/NS32490. The NIC 188 is for interfacing with CSMA/CD type local area networks such as Ethernet. The NIC functions to receive and transmit data packets to and from the network and includes all bus arbitration and memory support logic on a single chip.

The NIC has a single bus 189 which serves both as an address bus and a data bus. Latch 186 is used to hold the addresses for the NIC and addresses from the NIC. A data buffer 179 functions to isolate the data bus 178 of the processor from the NIC bus 187 and also functions to provide some bus arbitration features.

The NMM further includes a serial network interface (SNI) 190. SNI 190 can be an interface device marketed by National Semiconductor under the designation Dp8391/NS32491. The CSMA/CD data on the network and back plane bus 84 are Manchester encoded, and the SNI performs Manchester encoding and decoding functions.

The SNI receives the encoded data from the data steering logic (DSL) 90 which receives the CSMA/CD data from the CSMA/CD backplane bus 84 for forwarding to SNI 190 In addition, DSL 90 transmits CSMA/CD data from the SNI to the CSMA/CD bus. The data steering logic SLD 90 responds to and controls a status line 93 which is used to control the mode of the NMM. The NMM has various modes of operation wherein the NMM can act as a primary NMM for the concentrator, a backup NMM for the concentrator and a partition mode. In the partition mode the NMM can be isolated (partitioned) from the CSMA/CD bus 84 or isolated (partitioned) from the NMM up port connection in response to commands from the CCA.

The NMM further includes a repeater and retiming unit (RRU) 92, as previously explained, which repeats the CSMA/CD data received on bus 84 by way of the data steering logic 90. The RRU also retimes the data for transmission back to the CSMA/CD bus 84 and for transmission on the NMM Up Port by way of a medium dependent adapter (MDA) 198. MDA 198 also receives CSMA/CD data from the Up Port connection for retransmission on the CSMA/CD bus 84.

The data bus 178 is also connected to the Network Management Interface (NMI) 106 which provides the interface between the NMM and the backplane control bus. As previously described in connection with the description of FIGS. 10 and 11, the NMI 106 cooperates with the NMIs 107 in the host modules.

The NMI 106 of the NMM provides two functions. First, the NMI 106 is implemented to have the same circuitry as the NMI 107 used in the host modules as depicted in FIG. 11. This circuitry is used to provide backup NMM status similar to host module status, to the primary NMM. Second, the NMI 106 is implemented to provide control signals for control bus 86. The control bus delivers commands sent by the NMM to the host module and further provides the response from the host module back to the NMM.

As previously described, the NMM can issue either control commands or status commands to a particular host module in the concentration. The specific module (slot location) will decode the command and take action. The command transmitted over the control bus from the NMM NMI 106 and the responses from the host module NMI 107 are on eight lines of the bus which carry signals NMIDAT (FIG. 11). NMI 106 also produces the three control signals RD/WRL, DAT/CMDL and DENL which are used by the host module NMI 107 for receiving the commands and transmitting the response back to the NMM NMI 106.

The control console adapter CCA is similar to the NMM as can be seen in the functional block diagram of FIG. 20. Functional elements common to the CCA and NMM are designated with the same numerals. The CCA is functionally an intelligent Ethernet card. The serial network interface SNI 190 is connected to a fifteen pin electrical connector 191. The interface of the CCA with the network is simpler than the network interface of the NMM since the NMM must function with a CSMA/CD bus 84 whereas the CCA need only connect to a single network port. The connector 191 is typically coupled to an off card transceiver or media access unit (MAU) (not depicted) by way of an off card attachment unit interface (AUI).

The data bus 179 of the CCA is connected to a personal computer PC I/0 circuitry 83. I/0 circuitry 183 is coupled to the PC bus 97 and to the graphical user interface UI (the windows interface) of the PC by way of a memory resident interface (MRI) which is not depicted.

Although the CCA provides processing capability, it is possible to use a conventional Ethernet card with the processing function of the CCA being carried out by the processor and associated memory in the personal computer of the NMCC.

The User Interface in the Network Management Control Console also generates the expanded view of a particular concentrator front panel, as shown in FIGS. 7 and 9 utilizing data provided by the individual NMMs. Each NMM is capable of determining the configuration of the concentrator in which it is located by way of the control bus 86 (FIG. 10) of the concentrator back plane. As previously described, the NMM can ascertain which slots in the concentrator are occupied and, if occupied, the model and revision of the module which is located in the slot.

When the user selects a particular concentrator to be displayed in the expanded view window, the CCA requests status information regarding the concentrator from the associated NMM. Data regarding the model type and revision of each module in the concentrator, including the reporting NMM, and the location of the modules in the concentrator, are forwarded to the CCA. The bit mapped graphics are stored in the personal computer data base of the NMMCC. The appropriate bit map data can then be used to produce the concentrator image utilizing a conventional windows graphic user interface having graphics capability such as Microsoft Windows.

As previously explained, the various modules have one or more LEDs which provide miscellaneous status information. The expanded view image of the concentrator will reflect the actual status of an LED by either displaying a particular color area at the LED image location (to show illumination) or by displaying a black area (to show lack of illumination). The CCA will request that the NMM of a particular concentrator issue a command to the host modules in the concentrator, soliciting LED status information. The information is forwarded to the CCA and used by the interface to control the appearance of the LED images to reflect the actual status of the LEDs.

The foregoing can be further illustrated by the flow charts depicted in FIGS. 21A–21C. In FIG. 21A, block 200 indicates that the user first utilizes the mouse to select the particular concentrator to be displayed. Next, block 202 shows that the window graphic user interface creates the expanded view process/window.

The User Interface UI then obtains the module type data from the data attached to the concentrator child window as shown by block 204. The UI then obtains from its own data base, using the module type and revision number, the detailed module data including, for example, data for depicting the indicia of module model number, LED location, port location, and so forth, such as depicted in FIGS. 7 and 9.

The graphics bit map for the concentrator image is loaded and displayed on the NMCC screen, as indicated by block 208. Finally, a message is sent to the expanded view process to update itself with LED status information thereby concluding the process, as shown by elements 210 and 212.

The FIGS. 21B and 21C flow charts relate to the LED status update sequence. Block 214 of FIG. 21B indicate that a message is received by the expanded view process to update itself with LED status. The NMCC then transmits an LED STATUS PDU over the network to the appropriate concentrator (Block 216). The concentrator NMM will respond with 32 bits of encoded data for each module in the concentrator. Each bit of the data is capable of indicating the status of an LED in the module, with a "1" indicating that the LED is illuminated and a "0" indicating that the LED is off.

Block 220 of FIG. 21C indicates that the LED status data are received by the NMCC from the NMM of the concentrator over the network. The rectangular locations in the bit mapped graphics for the LED are then filled with the appropriate color (or black) based upon the received data thereby concluding the update (elements 222 and 224).

Thus, a novel apparatus and method have been disclosed to generate the topology of a network and to display an image of a concentrator which accurately depicts the state of the concentrator. While the invention has been described in some detail it is to be understood that those skilled in the art can make certain changes in the actual implementation without departing from the spirit and scope of the invention as defined in the following claims.

We claim:

1. Apparatus for monitoring the status of a star configured local area network having hubs, with a hub including a chassis for receiving a plurality of modules of varying type, each of the modules having at least one port for connecting a data terminal device to the hub, said apparatus comprising:

means for generating a topology of said network and for receiving topology data from a reporting hub wherein said topology data comprises addresses of other hubs which originated messages received by said reporting hub over a particular port of said reporting hub and an indentifier of said particular port;

location means for producing location data indicative of the location of each of the modules and each of the at least one port associated with the modules in the hub chassis;

type means for producing type data indicative of the type of each of the modules and each of the at least one port associated with the modules in the hub;

indicator means for indicating status information about each of said modules and for indicating status information about said at least one port associated with each of said modules, said indicator means also for isolating said status information for one particular module and associated at least one port, said indicator means coupled to said location means and also coupled to said type means;

modification means for modifying port status of each of said at least one port associated with each of said modules, said modification means responsive to a user input, said modification means coupled to said indicator means; and display means for producing an image of the hub utilizing said location data, said status information and said type data, with the image depicting the location of the modules in the hub and the type of modules, said display means coupled to said indicator means.

2. The apparatus of claim 1 wherein said display means includes storage means for storing a set of graphic data representing a graphic image for display on said display means, for each of the types of modules, which represents the appearance of the modules.

3. The apparatus of claim 2 wherein said modules include a front panel which bears an indicia of the type of module and said set of graphic data, representing a graphic image for display on said display means, include data which represents said indicia.

4. The apparatus of claim 2 wherein said set of graphic data include data which represents an image of the at least one port of the modules.

5. The apparatus of claim 2 wherein one type of the modules has at least one port with an optical connector for receiving an optical cable and wherein said set of graphic data include data which represent an image of said optical connector.

6. The apparatus of claim 2 wherein one type of the modules has at least one port with an electrical connector for receiving an electrical cable and wherein said set of graphic data include data which represents an image of said electrical connector.

7. The apparatus of claim 2 wherein said indicator means of one type of the modules includes a front panel which has a light source which indicates the status of the module and the status of said at least one port associated with each of said modules and wherein said set of graphic data include data which represents an image of the light source.

8. The apparatus of claim 7 wherein said indicator means includes a light source status means for producing light source status data indicative of the state of the light source and wherein said display means utilizes said status data to control the image of the light source.

9. The apparatus of claim 1 wherein said location means, said indicator means and said type means are disposed at the hub.

10. The apparatus of claim 9 wherein said display means is disposed separate from the hub.

11. The apparatus of claim 2 wherein said set of graphic data include data which represents an image of the at least one port of the module and wherein said indicator means of said apparatus further includes:

pointer means for designating a particular location on the image selected by a user;

module status means for producing module status data indicative of the status of the modules;

port status means for producing port status data indicative of the status of the port of the modules; and control means coupled to said modification means for selectively producing said module status data of a particular module when a user designates the image of said particular module utilizing said pointer means and for selectively producing said port status data of a particular port when a user designates the image of said particular port utilizing said pointer means.

12. A method of monitoring the status of a star configured network having hubs, with a hub including a chassis for receiving a plurality of modules of varying type, with each of the modules having at least one port for connecting a data terminal device to the hub, said method comprising the following steps:

generating a topology of said network by receiving topology data from a reporting hub wherein said topology data comprises addresses of other hubs which originated messages received by said reporting hub over a particular port of said reporting hub and an indentifier of said particular port;

generating and reporting by a hub location data indicative of the location of each of the modules and ports in the hub chassis;

generating and reporting by the hub type data indicative of the type data indicative of the type of each of the modules and ports in the hub; and producing an image of the hub utilizing said location data and said type data, with the image depicting the location of the modules in the hub and the type of modules in the hub.

13. A method of automatically determining the topology of a network of interconnected hubs which utilize contention control, with each of the hubs having modules and associated at least three data ports, each of which is for coupling the hub in a star configuration to either a data terminal device or another hub of the network, said method comprising the following steps:

transmitting from each of the hubs a message over the network which originates from the hub and which contains an address identifying an associated hub;

transmitting from each of the hubs a message over the network which was received by said associated hub from another hub on the network which originated the received message;

identifying, at each of the hubs, which of the data ports of said associated hub has received one of the messages transmitted by another hub of the network;

receiving topology data from each of the hubs, with the topology data identifying a particular one of the data ports of a particular reporting hub and receiving addresses of the other ones of the hubs which originated messages received by said particular reporting hub over the particular port;

determining the overall topology of the network utilizing said combining each of said received topology data; and displaying said overall topology on a display device, said step of displaying including displaying multiple hubs, modules and associated ports on said display device at the same time.

14. Apparatus for automatically determining the topology of a local area network of interconnected hubs which utilize contention control, with each of the hubs having at least three data ports, each of which is for coupling the hub in a star configuration to either a data terminal device or another hub in the local area network, said apparatus also for monitoring the status of a hub of a star configured local area network, with the hub including a chassis for receiving a plurality of modules of varying type, each of the modules having at least one port for connecting a data terminal device to the hub, said apparatus comprising:

transmit means at each of the hubs for transmitting hub messages over the local area network, said transmit means including (a) originate means for transmitting said hub messages which originate at an associated hub which contain an identifying address of said associated hub;

(b) repeat means for transmitting said hub messages received by said associated hub over the local area network which originated from other ones of said hubs of the network, said repeat means comprising a timing unit for retiming data to account for transmission distortion;

port identifying means at each of the hubs for identifying which of said data ports of said associated hub has received one of the said hub messages transmitted by another of said hubs of the local area network;

control means coupled to said local area network for receiving topology data reported from each of said hubs, said topology data reported for each data port of a particular reporting hub, said topology data identifying a particular one of said data ports of said particular reporting hub and said topology data identifying addresses associated with the the other ports of said hubs which originated network messages received by said particular reporting hub over said particular port;

processing means for determining the overall topology of the local area network utilizing and combining said received topology data;

location means for producing location data indicative of the location of each of the modules and ports in the hub chassis based on said overall topology;

type means for producing type data indicative of the type of each of the modules and ports in the hub; and indicator means for indicating status information about each of said modules and for indicating status information about said at least one port associated with each of said modules, said indicator means also for isolating said status information for one particular module and associated at least one port, said indicator means coupled to said location means and also coupled to said type means;

modification means for modifying port status of each of said at least one port associated with each of said modules, said modification means responsive to a user input, said modification means coupled to said indicator means; and display means for producing an image of the hub utilizing said overall topology, said location data, said status information and said type data, with the image depicting the location of the modules in the hub and the type of modules, said display means coupled to said indicator means.

15. The apparatus of claim 14 wherein said display means includes storage means for storing a set of graphic data representing a graphic image for display on said display means, for each of the types of modules, which represents the appearance of the modules and wherein said set of graphic data include data which represents an image of the at least one port of the modules.

16. The apparatus of claim 15 wherein said set of graphic data include data which represents an image of the at least one port of the module and said indicator means of said apparatus further includes:

pointer means for designating a particular location on the image selected by a user;

module status means for producing module status data indicative of the status of the modules;

port status means for producing port status data indicative of the status of the port of the modules; and control means for selectively producing said module status data of a particular module when a user designates the image of said particular module utilizing said pointer means and for selectively producing said port status data of a particular port when a user designates the image of said particular port utilizing said pointer means.

17. Apparatus for automatically determining the topology of a local area network of interconnected hubs which utilize contention control, with each of the hubs having at least three data ports, each of which is for coupling the hub in a star configuration to either a data terminal device or another hub in the local area network, said apparatus also for modifying status information with associated with said ports of said interconnected hubs, said apparatus comprising:

transmit means at each of the hubs for transmitting hub messages over the local area network, said transmit means including originate means for transmitting said hub messages which originate at an associated hub which contain an identifying address of said associated hub;

repeat means for transmitting said hub messages received by said associated hub over the local area network which originated from other ones of said hubs of the network, said repeat means comprising a timing unit for retiming data to account for transmission distortion, port identifying means at each of the hubs for identifying which of said data ports of said associated hub has received one of the said hub messages transmitted by another of said hubs of the local area network;

control means coupled to said local area network for receiving topology data reported from each of said hubs, said topology data reported for each data port of a particular reporting hub, said topology data identifying a particular one of said data ports of said particular reporting hub and said topology data identifying addresses associated with the other data ports of said hubs which originated network messages received by said particular reporting hub over said particular one of said data ports;

processing means for determining the overall topology of the local area network by utilizing and combining said received topology data from each of said reporting hubs;

status indicator means for indicating status information of said data ports of each of said hubs in said overall topology, said status indicator means also for isolating a particular data port status information;

modification means for changing said status information of said data ports of each of said hubs, said modification means coupled to said status indicator means and responsive to a user input device; and display means for displaying said overall topology in a graphic image format on a display device 18. The apparatus of claim 17 wherein said originate means periodically transmits one of said hub messages originating at said associated hub.

19. The apparatus of claim 17 wherein said control means receives said topology data in response to topology request messages which the control means transmits over the local area network to the hubs and wherein said control means transmits separate ones of said topology request messages to each of said hubs.

20. The apparatus of claim 19 wherein said control means monitors which of said hubs has responded to said topology request message and transmits additional topology request messages directed to any of the hubs for which a response in said topology data is not received by said control means.

21. The apparatus of claim 17 wherein each of said hubs includes a plurality of modules, with each of said modules having at least one of said data ports and wherein said hub includes monitoring means for identifying a particular one of said modules and a particular data port of said modules over which said hub has received said hub messages originating from other one of said hubs in the local area network.

22. The apparatus of claim 21 wherein said modules and data ports are of different types having varying capabilities and wherein said monitoring means is also a means for identifying said type of module and data port and wherein said topology data further includes type data indicative of the type of modules and data ports in said particular reporting hub.

23. The apparatus of claim 22 wherein said monitoring means identifies a particular one of said modules and a particular one of said data ports by determining a physical location of said module in said hub; wherein said status indicator means indicates the status of said data ports of said particular one of said data modules; and wherein said modification means allows modification of said ports of said particular one of said modules.

24. The apparatus of claim 23 wherein said hub includes a chassis having an electrical backplane for interconnecting said modules and said modules may be inserted in said chassis in any one of predetermined locations along said backplane, with said monitoring means determining said physical location by sensing the predetermined location where said modules are inserted.

25. A method of monitoring the status of a hub of a star configured network in accordance with claim 12 further comprising the step of providing modification to said ports of said modules based on said image of said hub and responsive to a user input 26. The method of claim 12 wherein said step of producing an image comprises the step of displaying a set of graphic data representing a graphic image for each of the types of modules, which represents the appearance of the modules.

27. The method of claim 26 wherein said modules comprise a front panel which bears an indicia of the type of module and said set of graphic data includes data which represents said indicia.

28. The method of claim 12 wherein said step of producing an image comprises the step of displaying a set of graphic data representing a graphic image for at least one port of the modules.

29. The method of claim 28 wherein one port comprises an optical connector for receiving an optical cable and wherein said set of graphic data include data which represent an image of said optical connector.

30. The method of claim 28 wherein one port comprises an electrical connector for receiving an electrical cable and wherein said set of graphic data include data which represent an image of said electrical connector.

31. The method of claim 12 further comprising the step of generating status data indicating status of the modules and ports of the hub and wherein said step of producing an image of said hub further comprises the steps of:

displaying a set of graphic data representing a front panel of a module of the hub which has a light source which indicates the status of the module; and displaying a set of graphic data representing the status data of said at least one port associated with each module.

32. The method of claim 12 further comprising the steps of:

generating status data indicating status of the modules and ports of the hub;

providing pointer means for designating a particular location on the image for selection by a user;

selectively displaying a set of graphic data representing module status data of a particular module when a user designates the image of said particular module utilizing said pointer means; and selectively displaying a set of graphic data representing port status data of a particular port when a user designates the image of said particular port utilizing said pointer means.

* * * * *

UNITED STATES PATENT AND TRADEMARK OFFICE
CERTIFICATE OF CORRECTION

PATENT NO. : 5,226,120
DATED : July 6, 1993
INVENTOR(S) : Brian Brown; Shabbir Chowdhury It is certified that error appears in the above-indentified patent and that said Letters Patent is hereby corrected as shown below:

On the title page, item [75] Inventors: should read as follows:

--[75] Inventors: Brian Brown; Shabbir A. Chowdhury, both of San Jose, CA; Jean-Lu Fontaine, Maisons Laffitt, FR; Chao-Yu Liang, San Jose; Ronald V. Schmidt, Portola Valley; Chang-Jung Wang, Cupertino, all of CA Col. 10, line 27, delete "(CSMA CD)" insert --(CSMA\CD)--.

Col. 17, line 53, delete "()ines" insert --(lines--.

Col. 25, line 13, after "190" insert --.--.

Col. 29, line 13, delete "data indicative of the type".

Col. 29, line 44, delete "said" (first occurrence) insert --and--.

Col. 30, line 18, delete "with the the" insert --with the--.

Col. 31, line 28, after the word "distortion" delete "," insert --;--.

Signed and Sealed this

Thirty-first Day of August, 1993

Attest:

BRUCE LEHMAN

Attesting Officer

*Commissioner of Patents and Trademarks*